US012775857B2

(12) United States Patent
Li et al.

(10) Patent No.: US 12,775,857 B2
(45) Date of Patent: Oct. 27, 2026

(54) PREDICTING MATCHING DENSITY WITH STRUCTURAL CAUSAL MODEL

(71) Applicant: Microsoft Technology Licensing, LLC, Redmond, WA (US)

(72) Inventors: Hua Li, Bellevue, WA (US); Amit Sharma, Bengaluru (IN); Jian Jiao, Bellevue, WA (US); Ruofei Zhang, Mountain View, CA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 1232 days.

(21) Appl. No.: 17/659,318

(22) Filed: Apr. 14, 2022

(65) Prior Publication Data

US 2023/0334350 A1 Oct. 19, 2023

(51) Int. Cl.

| | |
|---|---|
| ***G06N 7/01*** | (2023.01) |
| ***G06F 16/2458*** | (2019.01) |
| ***G06N 5/04*** | (2023.01) |
| ***G06N 20/00*** | (2019.01) |
| ***G06Q 30/0242*** | (2023.01) |

(52) U.S. Cl.

CPC .......... *G06N 7/01* (2023.01); *G06F 16/2477* (2019.01); *G06N 5/04* (2013.01); *G06N 20/00* (2019.01); *G06Q 30/0242* (2013.01)

(58) Field of Classification Search

CPC . G06N 7/01; G06N 20/00; G06N 5/04; G06F 16/2477; G06Q 30/0241–0275

See application file for complete search history.

(56) References Cited

U.S. PATENT DOCUMENTS

| | | | | |
|---|---|---|---|---|
| 8,175,914 B1 * | 5/2012 | Benson | ................ | G06Q 10/025 705/41 |
| 11,107,117 B1 * | 8/2021 | Calabrese | .......... | G06Q 30/0244 |
| 11,556,773 B1 * | 1/2023 | Aggarwal | .......... | G06Q 30/0242 |

(Continued)

OTHER PUBLICATIONS

Attariyan, et al., "X-ray: Automating Root-Cause Diagnosis of Performance Anomalies in Production Software", In Proceedings of 10th USENIX Symposium on Operating Systems Design and Implementation, Oct. 8, 2012, pp. 307-320.

(Continued)

*Primary Examiner* — Tamara T Kyle
*Assistant Examiner* — William Wong
(74) *Attorney, Agent, or Firm* — Alleman Hall LLP

(57) ABSTRACT

A computing device including a processor configured to receive data indicating, for a query category within a sampled time period, a matching density defined as a number of matches per query. The processor may generate a structural causal model (SCM) of the data within the sampled time period. The SCM may include a plurality of structural equations. Based at least in part on the plurality of structural equations, the processor may estimate a structural equation error value for the matching density. The processor may update a value of a target SCM output variable to a counterfactual updated value. Based at least in part on the SCM, the counterfactual updated value, and the structural equation error value, the processor may compute a predicted matching density when the target SCM output variable has the counterfactual updated value. The processor may output the predicted matching density.

16 Claims, 14 Drawing Sheets

(56) References Cited

U.S. PATENT DOCUMENTS

| | | | | |
|---|---|---|---|---|
| 2003/0046139 | A1* | 3/2003 | Beman | G06Q 30/0244 705/14.43 |
| 2003/0050863 | A1* | 3/2003 | Radwin | G06Q 30/0277 705/26.1 |
| 2007/0156621 | A1* | 7/2007 | Wright | G06Q 30/02 706/48 |
| 2009/0254397 | A1* | 10/2009 | Mahdian | G06Q 30/02 705/7.29 |
| 2013/0173578 | A1* | 7/2013 | Epstein | G06Q 30/0256 707/706 |
| 2014/0201126 | A1* | 7/2014 | Zadeh | A61B 5/165 706/52 |
| 2015/0142554 | A1* | 5/2015 | Karlsson | G06Q 30/0243 705/14.42 |
| 2018/0040032 | A1* | 2/2018 | Chalasani | G06Q 30/0277 |
| 2021/0110287 | A1* | 4/2021 | Perov | G06N 7/01 |
| 2021/0232940 | A1* | 7/2021 | Dalli | G06N 3/042 |
| 2021/0256406 | A1* | 8/2021 | Mueller | G06F 16/287 |

OTHER PUBLICATIONS

Berman, Ron, "Beyond the Last Touch: Attribution in Online Advertising", In Journal of Marketing Science, vol. 37, Issue 5, Sep. 2018, 48 Pages.
Bottou, et al., "Counterfactual Reasoning and Learning Systems: The Example of Computational Advertising", In Journal of Machine Learning Research, vol. 14 Issue 11, Nov. 2013, pp. 3207-3260.
Castro, et al., "Polynomial Calculation of the Shapley Value based on Sampling", In Journal of Computers & Operations Research, vol. 36, Issue 5, May 2009, pp. 1726-1730.
Dalessandro, et al., "Causally Motivated Attribution for Online Advertising", In Proceedings of the Sixth International Workshop on Data Mining for Online Advertising and Internet Economy, Aug. 12, 2012, 9 Pages.
Dash, et al., "Evaluating and Mitigating Bias in Image Classifiers: A Causal Perspective Using Counterfactuals", In Proceedings of the IEEE/CVF Winter Conference on Applications of Computer Vision, Jan. 3, 2022, pp. 915-924.
Driessen, Theo S. H., "A Survey of Consistency Properties in Cooperative Game Theory", In Journal of SIAM Review, vol. 33, Issue 1, Mar. 1991, pp. 43-59.
Efron, Bradley, "Prediction, Estimation, and Attribution", In Journal of International Statistical Review, vol. 88, Dec. 2020, pp. 636-655.
Fatima, et al., "A Linear Approximation Method for the Shapley Value", In Journal of Artificial Intelligence, vol. 172, Issue 14, Sep. 2008, pp. 1673-1699.
Halpern, Joseph Y., "Actual Causality", Published by: MIT Press, 2016, 169 Pages.
Janzing, et al., "Causal Structure based root cause analysis of outliers", In Repository of arXiv:1912.02724v1, Dec. 5, 2019, pp. 1-11.
Ji, et al., "A Probabilistic Multi-Touch Attribution Model for Online Advertising", In Proceedings of the 25th ACM International on Conference on Information and Knowledge Management, Oct. 24, 2016, pp. 1373-1382.
Lim, et al., "Temporal Fusion Transformers for interpretable multi-horizon time series forecasting", In International Journal of Forecasting, vol. 37, Issue 4, Oct. 2021, pp. 1748-1764.
Makridakis, et al., "The M4 Competition: 100,000 time series and 61 forecasting methods", In International Journal of Forecasting, vol. 36, Issue 1, Jan. 2020, pp. 54-74.
Mothilal, et al., "Towards Unifying Feature Attribution and Counterfactual Explanations: Different Means to the Same End", In Proceedings of AAAI/ACM Conference on AI, Ethics, and Society, May 19, 2021, pp. 652-663.
Nagaraj, et al., "Structured Comparative Analysis of Systems Logs to Diagnose Performance Problems", In Proceedings of 9th USENIX Symposium on Networked Systems Design and Implementation, Apr. 25, 2012, pp. 1-14.
Pearl, et al., "The Seven Tools of Causal Inference, with Reflections on Machine Learning", In Journal of Communications of the ACM, vol. 62, Issue 3, Mar. 2019, pp. 54-60.
Salinas, et al., "DeepAR: Probabilistic forecasting with autoregressive recurrent networks", In Journal of International Journal of Forecasting, vol. 36, Issue 3, Jul. 2020, pp. 1181-1191.
Shao, et al., "Data-driven Multi-touch Attribution Models", In Proceedings of the 17th ACM SIGKDD International Conference on Knowledge Discovery and Data Mining, Aug. 21, 2011, pp. 258-264.
Singal, et al., "Shapley Meets Uniform: An Axiomatic Framework for Attribution in Online Advertising", In Journal of Management Science, Jan. 21, 2022, pp. 1-23.
Winter, Eyal, "The Shapley Value", In Handbook of Game Theory with Economic Applications, vol. 3, Jan. 1, 2002, pp. 2025-2054.
Yamamoto, Teppei, "Understanding the Past: Statistical Analysis of Causal Attribution", In American Journal of Political Science, vol. 56, Issue 1, Jan. 2012, 40 Pages.
Zhang, et al., "The Inflection Point Hypothesis: A Principled Debugging Approach for Locating the Root Cause of a Failure", In Proceedings of the 27th ACM Symposium on Operating Systems Principles, Oct. 27, 2019, 16 Pages.
Lundberg, et al., "A Unified Approach to Interpreting Model Predictions", In Repository of arXiv:1705.07874v2, Nov. 25, 2017, pp. 1-10.
Pearl, Judea, "Causality: Models, Reasoning, and Inference", Published by: Cambridge University Press, 2009, 9 Pages. (Title and Table of Contents Submitted.).

* cited by examiner

PREDICTING MATCHING DENSITY WITH STRUCTURAL CAUSAL MODEL

BACKGROUND

Search engines frequently display advertisements in or alongside search results that are returned in response to user queries. When advertising customers purchase these advertisements from the search engine service, the advertising customers typically define query categories with which their advertisements are associated. When a user of the search engine performs a search, the search engine may identify one or more query categories to which the user's search query belongs. The search engine may then display one or more advertisements that match the one or more query categories of the user's search query. Thus, the search engine may display relevant advertisements in the user's search results.

In order for the search engine to obtain revenue from an advertising customer, the advertisements requested by the advertising customer typically have to be displayed to a search engine user in response to a search query that matches the advertising customer's one or more specified categories. The number of advertisements matched per query, referred to as the matching density, may be used by the provider of the search engine service to dynamically determine an associated cost per impression for the query. The advertising customer establishes an advertising campaign, which specifies an advertisement, a query category, and an advertising budget. The advertising budget may include a maximum cost per impression. As each search query is entered by a user of the search engine, a matching algorithm is used to select from among advertising campaigns have specified a matching query category, and for which the advertising budget exceeds the current cost-per-impression for the query category. In this way, the matching algorithm takes into account matching density to determine demand based pricing.

In addition, the matching density may indicate the effectiveness of the customer's advertising campaign at displaying advertisements to users of the search engine. For example, the matching density for a query category may help explain why a total number of impressions achieved by an advertising campaign over a time period was low or high, etc. The matching density may therefore be a metric that is relevant to the decision-making of both the search engine provider and the advertising customer.

SUMMARY

According to one aspect of the present disclosure, a computing device is provided, including a processor configured to receive advertising data. The advertising data may indicate, for a query category at a plurality of time intervals within a sampled time period, a matching density defined as a number of advertisements matched per query in the query category. The processor may be further configured to generate a structural causal model (SCM) of the advertising data within the sampled time period. The SCM may include a plurality of structural equations that each express a respective SCM output variable as a function of one or more SCM input variables. The plurality of SCM output variables may include the matching density and a plurality of additional SCM output variables. Based at least in part on the plurality of structural equations, the processor may be further configured to estimate a structural equation error value for the matching density. The processor may be further configured to update a value of a target SCM output variable of the plurality of additional SCM output variables to a counterfactual updated value. Based at least in part on the SCM, the counterfactual updated value, and the structural equation error value, the processor may be further configured to compute a predicted matching density for the query category when the target SCM output variable has the counterfactual updated value. The processor may be further configured to output the predicted matching density.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

DETAILED DESCRIPTION

As discussed above, matching density for advertisements may be useful to measure for search engine providers and advertising customers. An advertising customer may, for example, use historical data on matching density to estimate the effectiveness of an advertising campaign. As another example, when planning a new advertising campaign, the customer may wish to predict the matching densities of different query categories at different times.

The matching densities of query categories may have large amounts of variation over time. For example, the matching density of a query category may vary over time as a result of seasonal effects, holidays, news events, changes to functionality of the search engine, or other causes. However, since many factors may causally contribute to the matching density, it may be difficult to predict future behavior of the matching density or determine the effects of different interventions. Accordingly, it may be difficult for search engine providers and advertising customers to use matching density data to inform their decision-making.

Figure 1:
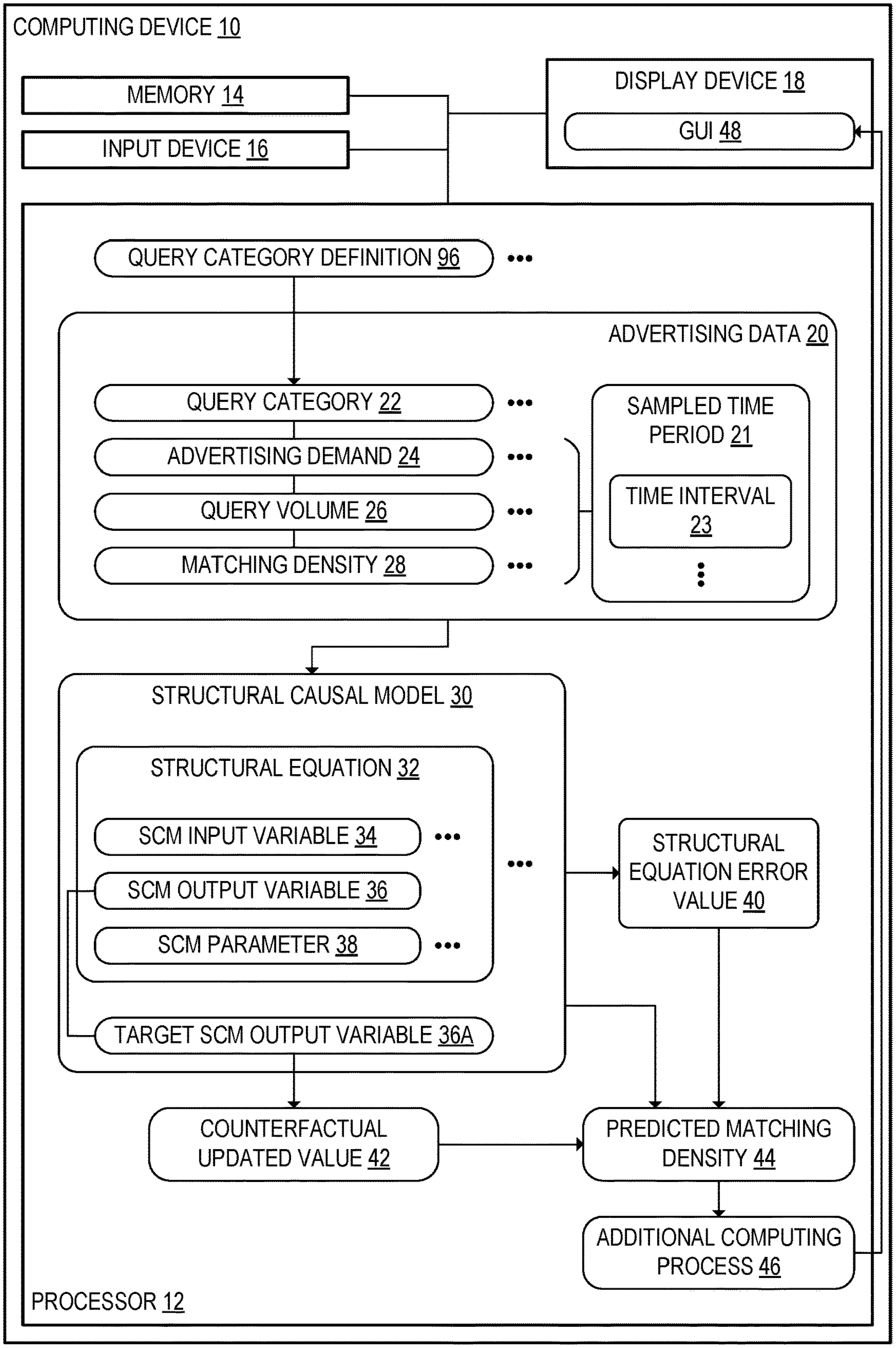
FIG. 1 schematically shows a computing device including a processor configured to receive advertising data, according to one example embodiment.

In order to address the above challenges, a computing device 10 is provided, as depicted schematically according to the example of FIG. 1. The computing device 10 may include a processor 12 configured to execute instructions to perform computing processes. The processor 12 may be instantiated as one or more physical processing devices. In addition, the computing device 10 may further include memory 14 communicatively coupled to the processor 12. The memory 14 may, for example, include one or more volatile memory devices and/or one or more non-volatile memory devices.

The computing device 10 may further include one or more input devices 16 at which a user may enter user input to other components of the computing device 10. The one or more input devices 16 may, for example, include a keyboard, a mouse, a touchscreen, a microphone, an accelerometer, an optical sensor, and/or other types of input devices. In addition, the computing device 10 may further include one or more output devices, which may include a display device 18. One or more other types of output devices, such as a speaker or a haptic feedback device, may additionally or alternatively be included in the computing device 10. The display device 18 may be configured to display a graphical user interface (GUI) 48 at which the user may view outputs of computing processes executed at the processor 12. The user may interact with the GUI 48 via the one or more input devices 16 to provide user input to the computing device 10.

The computing device 10 may be instantiated in a single physical computing device or in a plurality of communicatively coupled physical computing devices. For example, at least a portion of the computing device 10 may be provided as a server computing device located at a data center. In such examples, the computing device 10 may be further configured to communicate with one or more client computing devices over a network, as discussed in further detail below.

The processor 12 included in the computing device 10 may be configured to receive advertising data 20. The advertising data 20 may be received for a query category 22 within a sampled time period 21. The query category 22 may include one or more keywords that are related to a shared category of subject matter. The one or more query categories 22 may, in some examples, be specified by one or more user-specified query category definitions 96. The one or more query category definitions 96 may each indicate one or more keywords, key phrases, or keyword categories with which the processor 12 is configured to construct a user-defined query category 22. Some example query categories 22 are "apparel," "arts and entertainment," and "beauty and personal care." In some examples, a query category 22 may include one or more query sub-categories. For example, the "arts and entertainment" query category 22 may include query sub-categories such as "television," "film," and "video games." When the processor 12 receives the advertising data 20, the advertising data 20 may specify a plurality of query categories 22 and may, in some examples, further specify a plurality of query sub-categories.

The sampled time period 21 for which the advertising data 20 is received may be divided into a plurality of time intervals 23 into which the processor 12 may be configured to group the advertising data 20. For example, the processor 12 may be configured to receive advertising data 20 for each of a plurality of days included within the sampled time period 21. Other time intervals 23 such as hours or weeks may be used as buckets for the advertising data 20 in other examples. Thus, the processor 12 may be configured to receive the advertising data 20 as time-series data.

The advertising data 20 may indicate a matching density 28 for the query category 22 within the sampled time period 21. As discussed above, matching density 28 is defined as a number of advertisements matched per query in the query category 22. When the processor 12 receives the advertising data 20, the processor 12 may be configured to receive a plurality of matching densities 28 of individual queries included in the query category 22 that occurred within the sampled time period. These matching densities 28 may be received as numbers of advertisements returned in response to those individual queries.

In some examples, the advertising data may further include respective values of an advertising demand 24 and a query volume 26 in addition to the matching density 28 for the sampled time period 21. The advertising demand 24, in such examples, indicates a number of purchased advertisements associated with the query category 22. The query volume 26 indicates a number of performed search queries associated with the query category 22. The data on the advertising demand 24 and the query volume 26 may include respective values associated with each of the time intervals included in the sampled time period 21.

Although the matching density 28 includes numbers of advertisements output per query, the values of the matching density 28 are not generally obtainable simply by dividing the advertising demand 24 by the query volume 26 for a time interval 23. For example, the matching density 28 may differ from the ratio of the advertising demand 24 to the query volume 26 in scenarios in which a plurality of advertising customers compete for a limited number of advertisement display slots included in a search result page. As another example, a user of the search engine may enter a query that does not match any of the query categories 22 for which advertisements were purchased. Thus, the matching density 28 may be related to the advertising demand 24 and the query volume 26 by a more complex relationship that may be influenced by a variety of causal factors. The processor 12 may be configured to model the causal influences on the matching density 28 as discussed below.

Subsequently to receiving the advertising data 20, the processor 12 may be further configured to generate a structural causal model (SCM) 30 of the advertising data 20 within the sampled time period. The SCM 30 may include a plurality of structural equations 32 that each express a respective SCM output variable 36 as a function of one or more SCM input variables 34. In addition, each structural equation 32 included in the SCM 30 may include one or more SCM parameters 38 that affect the relationship between the one or more SCM input variables 34 and the SCM output variable 36 included in that structural equation 32. For example, when the structural equation is a polynomial function, the one or more SCM parameters 38 may be one or more coefficients of terms included in the polynomial function. Other types of functions, such as trigonometric functions, exponential functions, or logarithmic functions, may be included among the one or more structural equations 32 in some examples.

Figure 2:
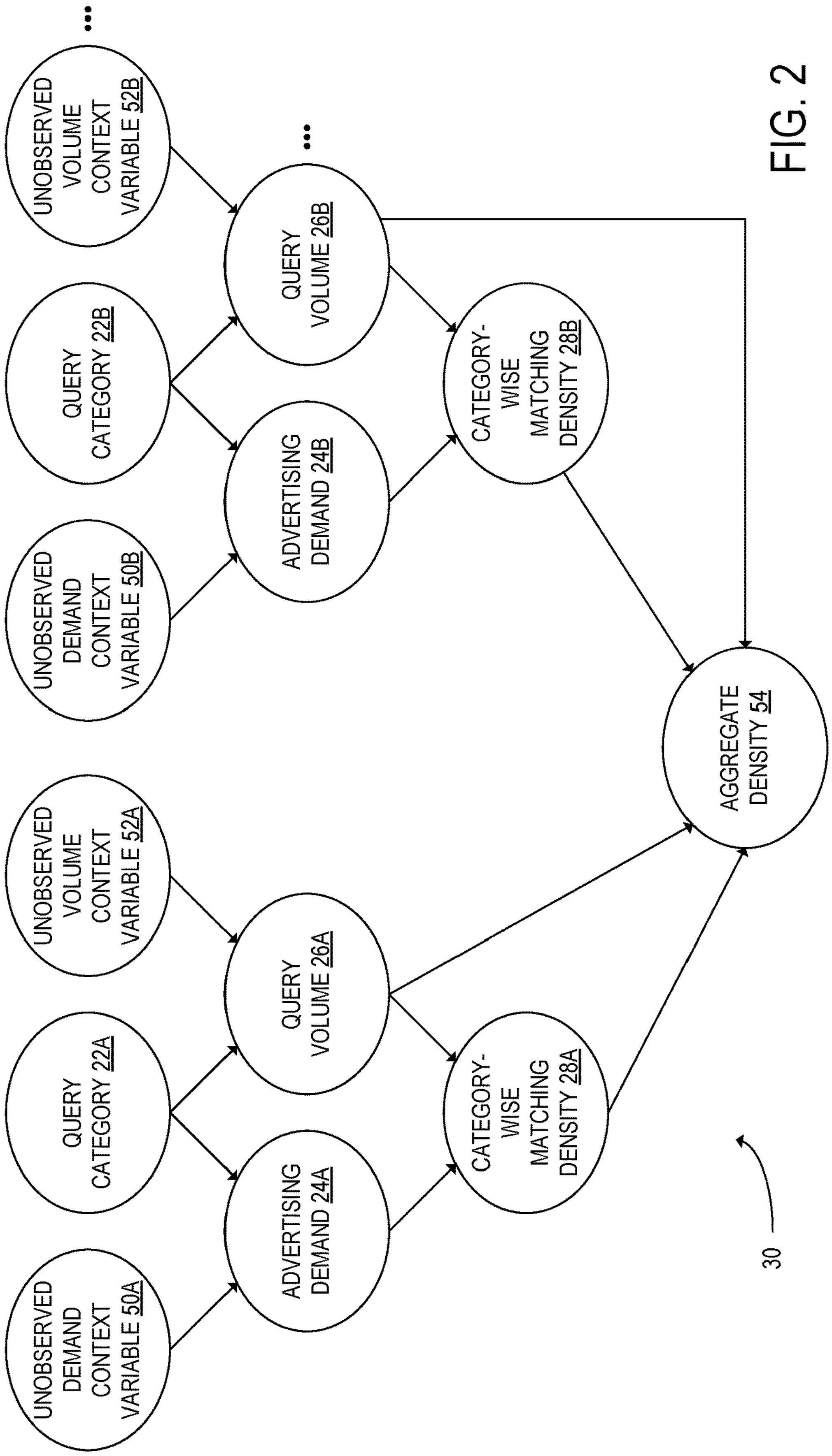
FIG. 2 schematically shows an example of a structural causal model, according to the example of FIG. 1.

FIG. 2 schematically shows an example of an SCM 30. The example SCM 30 of FIG. 2 is structured as a directed acyclic graph (DAG) that forms a four-layer hierarchy. The SCM 30 shown in FIG. 2 includes a plurality of query categories 22 including a query category 22A and a query category 22B. The query categories 22A and 22B have respective advertising demands 24A and 24B and respective query volumes 26A and 26B. In addition to the query category 22A, the advertising demand 24A further depends upon an unobserved demand context variable 50A. The query volume 26A also depends upon an unobserved volume context variable 52A in addition to the query category 22A. Similarly, in addition to depending upon the query category 22B, the advertising demand 24B further depends upon an unobserved demand context variable 50B, and the query volume 26B further depends upon an unobserved volume context variable 52B.

The SCM 30 further includes a category-wise matching density 28A for the query category 22A that depends upon the advertising demand 24A and the query volume 26A and a category-wise matching density 28B for the query category 22B that depends upon the advertising demand 24B and the query volume 26B. Thus, the variables $\{ad^{c1}, qv^{c1}, ad^{c2}, qv^{c2}, \ldots, ad^{ck}, qv^{ck}\}$ may be the 2 k inputs included in the advertising data 20, where ci is the query category, ad refers to advertising demand, qv refers to query volume, and k is the number of query categories 22.

The example SCM 30 of FIG. 2 further includes an aggregate density 54 that is computed as an aggregation over the plurality of matching densities 28, including the category-wise matching density 28A and the category-wise matching density 28B. The aggregate density 54 may further depend upon the plurality of query volumes 26, including the query volume 26A and the query volume 26B. In some examples, the aggregate density 54 may be a daily density associated with a specific day included in the sampled time period 21. The aggregate density 54 over a plurality of query categories 22 may, in such examples, be given by $$y_t = f\left(den_t^{c1}, qv_t^{c1}, \ldots, den_t^{ck}, qv_t^{ck}\right) = \frac{\sum_c den_t^c qv_t^c}{\sum_c qv_t^c}$$

where $$den_t^c$$

is the density of category c on day t and $$qv_t^c$$

is the query volume for the category on day t.

As shown in FIG. 2, the plurality of SCM output variables 36 may include the corresponding matching density 28 for each query category 22. The plurality of SCM output variables 36 may further include a plurality of additional SCM output variables 36, which may include one or more intermediate variables. When the SCM 30 includes three or more layers, as in the example of FIG. 2, the one or more respective SCM output variables 36 of one or more of the structural equations 32 may be one or more intermediate variables that are used as one or more respective SCM input variables 34 of one or more of the other structural equations 32. For example, as shown in FIG. 2, the SCM 30 may include a structural equation for the category-wise matching density 28A as a function of the advertising demand 24A and the query volume 26A. Thus, the plurality of structural equations 32 may have a hierarchical structure that defines the topology of the SCM 30.

Figure 3:
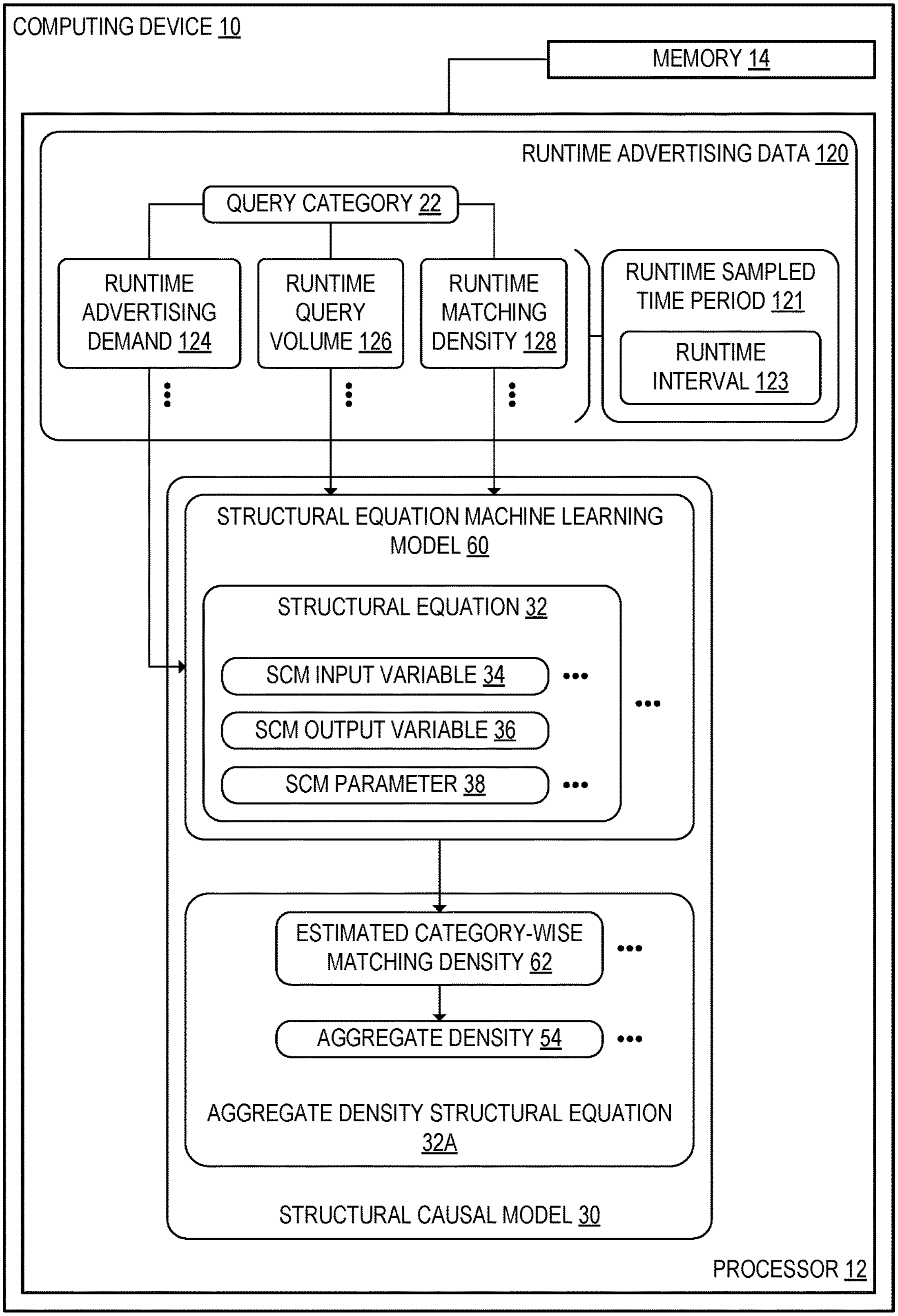
FIG. 3 shows the computing device with the structural causal model including a structural equation machine learning model, according to the example of FIG. 1.

In some examples, as shown in FIG. 3, at least a portion of the SCM 30 may be instantiated as a structural equation machine learning model 60. FIG. 3 schematically shows the structural equation machine learning model 60 at inferencing time when the structural equation machine learning model receives runtime advertising data 120. The structural equation machine learning model 60 may, for example, be a deep neural network in which the plurality of structural equations 32 are each implemented at one or more layers. The SCM parameters 38 may, in such examples, be encoded as the parameters of the structural equation machine learning model 60.

In the example of FIG. 3, the structural equation machine learning model 60 is configured to receive values of a runtime advertising demand 124, a runtime query volume 126, and a runtime matching density 128 as input. These inputs are received for a runtime sampled time period 121. The output of the structural equation machine learning model 60 may be an estimated category-wise matching density 62. In such examples, the estimated category-wise matching density 62 is a value of the runtime matching density 128 predicted for a runtime interval 123 for which the structural equation machine learning model 60 does not receive a runtime matching density 128 as input.

The structural equation machine learning model 60 may be configured to receive respective values of the runtime advertising demand 124 and runtime query volume 126 for each of a plurality of u time intervals 23 included in the sampled time period 21. The plurality of values of the runtime matching density 128 may be received for each of the u runtime intervals 123 other than a runtime interval 123 for which the estimated category-wise matching density 62 is configured to be generated. For example, when the plurality of runtime intervals 123 are days, the structural equation machine learning model 60 may be configured to receive values of the runtime advertising demand 124 and runtime query volume 126 for each of the most recent seven days or fourteen days in order to account for within-week temporal variation in the runtime advertising demand 124 and runtime query volume 126. At the structural equation machine learning model 60, the processor 12 may be configured to compute the estimated category-wise matching density 62 for the query category 22 as:

$$\hat{g}\left(ad_t^c, qv_t^c, den_{t-1}^c, den_{t-1}^2, \ldots, den_{t-14}^c\right)$$

In the above equation, ĝ is the function applied by the structural equation machine learning model 60. In other examples, values of the runtime matching density 128 may be received for time intervals t−1, . . . ,t−u for some other positive integer value of u.

Figure 4:
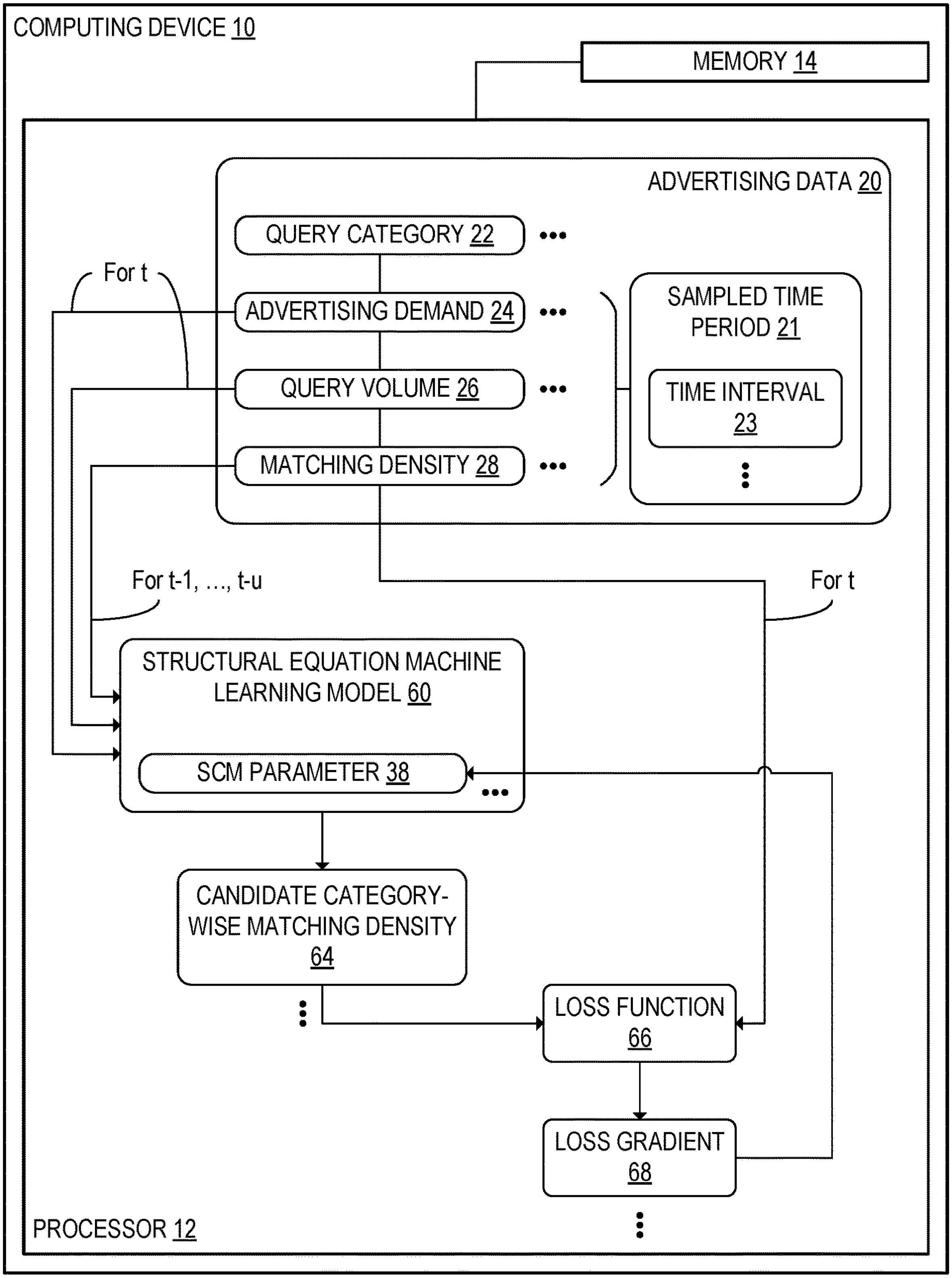
FIG. 4 schematically shows the structural equation machine learning model of FIG. 3 during training time.

FIG. 4 schematically shows the structural equation machine learning model 60 during training time. As shown in the example of FIG. 4, the processor 12 may be configured to train the structural equation machine learning model 60 using the advertising data 20 as training data. The structural equation machine learning model 60 may be trained via supervised time series prediction. During each of a plurality of training iterations that occur during training of the structural equation machine learning model 60, $$ad_t^c, qv_t^c, den_{t-1}^c, den_{t-2}^c, \ldots, den_{t-u}^c$$

may be used as training inputs. The observed matching density $$den_t^c$$

may be used as a ground truth output for the structural equation machine learning model 60.

Respective training iterations may be performed for a plurality of time intervals t included in the sampled time period 21. In each of the training iterations, the values of the advertising demand 24 and the query volume 26 at t and the values of the matching density 28 at t−1, . . . , t−u may be received as inputs, and a candidate category-wise matching density 64 for the time interval t may be generated as an output of the structural equation machine learning model 60. The processor 12 may be further configured to input the candidate category-wise matching density 64 and the matching density 28 at the time interval t into a loss function 66 at which the processor 12 may be configured to compare the candidate category-wise matching density 64 to the matching density 28 at the time interval t that is used as the ground-truth matching density. The processor 12 may be further configured to compute a loss gradient 68 of the value of the loss function 66 with respect to the SCM parameters 38 included in the structural equation machine learning model 60. The processor 12 may be further configured to train the structural equation machine learning model 60 by performing gradient descent using the values of the loss gradient 68 computed in the plurality of training iterations.

Returning to the example of FIG. 2, the SCM 30 may also include one or more other structural equations that are defined according to other approaches, such as an aggregate density structural equation 32A that may be defined as discussed above. The aggregate density structural equation 32A may receive, as input, values of the matching density 28 output by the structural equation machine learning model 60. Using the aggregate density structural equation 32A, the processor 12 may be configured to compute one or more values of the aggregate density 54.

In other examples, such as when the relationship between the advertising demand 24, the query volume 26, and the matching density 28 is encoded explicitly in the advertising data 20, the processor 12 may be configured to generate other structural equations 32 without the use of machine learning. In some examples, one or more of the structural equations 32 may be input manually by a user.

Returning to FIG. 1, subsequently to generating the SCM 30, the processor 12 may be further configured to utilize the SCM 30 to generate one or more predicted values of the matching density 28. As a preliminary step to matching density value prediction, the processor 12 may be further configured to estimate a structural equation error value 40 for the matching density 28 based at least in part on the plurality of structural equations 32. The structural equation error value 40 may be a difference between an observed value of the matching density 28 and an estimated category-wise matching density 62 computed at the structural equation machine learning model 60. The structural equation error value 40 may, in such examples, be computed as:

$$\hat{\epsilon}^c = den_t^c - \hat{g}(ad_t^c, qv_t^c, den_{t-1}^c, den_{t-2}^c, \ldots, den_{t-14}^c)$$

The processor 12 may be further configured to update a value of a target SCM output variable 36A of the plurality of additional SCM output variables 36 to a counterfactual updated value 42. For example, the processor 12 may be configured to update a value of the advertising demand 24 such that $$ad^c \leftarrow ad_r^c$$

for some other day r. In this example, although the advertising demand 24 is received as an input at the structural equation machine learning model 60, the advertising demand 24 is an intermediate variable that is included among the plurality of SCM output variables 36, as shown in the example SCM 30 of FIG. 2.

The processor 12 may be further configured to compute a predicted matching density 44 for the query category 22 when the target SCM output variable 36A has the counterfactual updated value 42. The predicted matching density 44 may be computed based at least in part on the SCM 30, the counterfactual updated value 42, and the structural equation error value 40. In some examples, the predicted matching density 44 may be a prediction of the matching density 28 of a specific query category 22. In other examples, the predicted matching density 44 may be a prediction of the aggregate density 54. The processor 12 may be further configured to output the predicted matching density 44 to an additional computing process 46. For example, as discussed in further detail below, the additional computing process 46 may be a GUI generating program via which the predicted matching density 44 may be output for display at the GUI 48. As another example, the predicted matching density 44 may be output to an advertising campaign scheduling program at which the processor 12 may be configured to programmatically generate an advertising campaign schedule.

In examples in which the target SCM output variable 36A is an advertising demand 24, as discussed above, the processor 12 may be further configured to update the value of the category-wise matching density according to the equation $$den'^c := \hat{g}(ad_r^c, qv_t^c, den_{t-1}^c, den_{t-2}^c, \ldots, den_{t-14}^c) + \hat{\epsilon}^c$$

The processor 12 may be further configured to compute the aggregate density 54 with the updated value of the category-wise matching density den'$^c$.

In some examples, the target SCM output variable 36A may be the query volume 26 for a query category 22 rather than the advertising demand 24 for that query category 22. In such examples, the processor 12 may be configured to update the value of the query volume 26 such that $$qv^c \leftarrow qv_r^c.$$

The processor 12 may be further configured to compute den'$^c$ as $$den'^c := \hat{g}(ad_t^c, qv_r^c, den_{t-1}^c, den_{t-2}^c, \ldots, den_{t-14}^c) + \hat{\epsilon}^c$$

and compute the aggregate density 54 using den'$^c$ as discussed above.

Actual cause attribution for changes in the matching density 28 is discussed below. For an outcome variable Y, let $Y=y_t$ be a value that needs to be explained (e.g., an extreme value). The goal of actual cause attribution is to explain the value by attributing it to a set of input variables, X. The relationships between the input variables and the outcome are modeled using the SCM M, which, as discussed above, is structured as a causal DAG and is encoded by structural equations describing the generating functions for each variable. In addition, the SCM has mutually independent, unobserved error terms u that characterize a context for the system. The outcome value is written as $Y(u)=y_t$.

For example, consider a system that crashes whenever its load crosses 0.9 units. The system can be described by the following structural equations: $y=I_{load\geq 0.9}$; $load=0.5x_1+0.4x_2+0.9x_3$; $x_i$=Bernoulli (0.5)∀i. The corresponding graph for the system includes the following edges: $X_1, X_2, X_3 \rightarrow L$; $L \rightarrow Y$. The value of each $X_i$ is affected by the independent error terms through the Bernoulli distribution. Given that the system crashed (y=1), the crash may be attributed to $x_1$, $x_2$, $x_3$. If observed data is $x_1=0$, $x_2=0$, $x_3=1$, then $x_3=1$ is the reason for the crash since it alone can cause load to reach 0.9. However, if $x_2$ and $x_3$ were also 1 at the time of the crash, $x_2$ and $x_3$ can be equally a reason for the crash since their coefficients sum to 0.9. If any of $x_2$ or $x_3$ is zero, then the other one does not explain the crash. Thus, the attribution for any input variable depends on the structural equations and also on the values of other variables. Combined, the SCM M and the specific realization of U=u of the unobserved context variables (and hence the observed inputs), is called a causal setting, <M, u>, that determines the attribution of an input. The above intuition may be formalized for arbitrary structural causal models M with n inputs, X. For simplicity, the below definition is provided for a subset of inputs $X_A \subseteq X$ that are non-descendants of each other.

The actual cause may be defined as follows. Given a causal setting ⟨M, u⟩, an observed outcome $Y(u)=y_t$, and input $V \subset X_A$, $V=v_t$ is an actual cause of the event $Y=y_t$ if:

1. Under the causal setting <M, u>, it is observed that $V=v_t$ and $Y=y_t$.
2. There exists a value v' in the range of V and a value w' of all other inputs W ($W=X_A \backslash V$) such that setting V=v' changes the outcome: $Y_{v',w'}(u) \neq y_t$; $Y_{v,w'}(u)=y_t$.
3. V is minimal. That is, there does not exist a subset $V_S \subset V$ such that $V_S$ satisfies conditions 1 and 2.

Continuing the example above, if $x_1=x_2=x_3=1$, then all three inputs are actual causes of the system crash, since there exists a context of the other variables such that if the input variable is changed, then the system crash would not have happened. In order to rank the inputs by their strength of attribution, a stronger definition may be used, but-for cause. An actual cause is called a but-for cause where the value of W for condition 2 is the same as the observed one, $W=w_t$. It implies that if V is changed from $v_t$ to some v', then that change is enough to change the output Y. For instance, if $x_3=1$ and any of other two features are zero, then $x_3$ is a but-for actual cause. If all three inputs are 1, however, then no input is a but-for cause.

Actual cause strength (ACS) may be defined as follows. Given an output $Y=y_t$ and an actual cause $V=v_t$ under a causal setting <M, u>, the actual cause strength ACS is given by the fraction of all value settings of W such that changing the value of V changes the output Y, where each value setting is weighted by its probability. ACS may accordingly be expressed as:

$$ACS = \sum_{W=w} 1_{Y_{v',w} \neq Y_{v_t,w}} P(W=w) \text{ or}$$

$$\sum_{W=w} (Y_{v_t,w} - Y_{v',w}) P(W=w)$$

The second equation assumes an ordering over values of Y. In the absence of any extra information, the probability P(W=w) may be given by the chance of observing W=w among all $2^{n-1}$ values of W. This leads to $P(W=w)=\frac{1}{2}^{n-1}$. In the above example, the strength for $x_1$ and $x_2$ comes out to be ¼ each while the strength of $x_3$ is ¾.

Alternatively, the probability weights may be given by the total number of orderings of W possible that lead to W=w. This weighing has the property that the probability of observing all zeros or all ones is the highest, reflecting the individual contribution of the actual cause when all other inputs are enabled (necessity) and when they are disabled (sufficiency), whereas values with roughly equal ones or zeros are weighted less. This weighting is given by $|W_0|!*|W_1|!$ where $W_0 \subseteq W$ refers to the subset that has value 0 and $W_1 \subseteq W$ refers to the subset that has value 1. ($W_1 \cup W_0 = W$). Accordingly, when the combinatoric definition of the weights is used, the ACS may be given as follows:

$$ACS = \frac{\sum_{W_0,W_1} |W_0|!|W_1|!(Y_{v_t,W_0=0,W_1=1} - Y_{v',W_0=0,W_1=1})}{\sum_{W_0,W_1} |W_0|!|W_1|!}$$

In the above example, the strengths of $x_1$ and $x_2$ are each 1/6 while the strength of $x_3$ is 4/6. These scores sum to 1.

The above definition of the ACS is equivalent to the Shapley value for a value function equal to y. The Shapley value that is equivalent to the ACS is the Shapley value for a cooperative game with n inputs X as players and a value function h(v, w)=y. The Shapley value of an input v is $$SV = \sum_{S \subseteq X \setminus \{v\}} \frac{|S|!(n-|S|-1)!}{n!}(h(S \cup \{v\}) - h(S))$$
$$= \sum_{S \subseteq X \setminus \{v\}} \frac{|S|!(n-|S|-1)!}{\sum_{S \subseteq X \setminus \{v\}} |S|!(n-|S|-1)!}(h(S \cup \{v\}) - h(S))$$

The second equation is due to the equality $n! = \Sigma_{S \subseteq X \setminus \{v\}} |S|!(n-|S|-1)!$. Substituting S as the set $W_1$ of variables with value 1 results in $n-|S|-1=1=W_0$, where $W_0$ is the set of variables with value 0, $W_1 \cup W_0 = W$. Replacing h by Y, the Shapley value may be given by $$SV = \sum_{W_1 \subseteq X \setminus \{v\}} \frac{|W_1|!|W_0|!}{\sum_{W_1 \subseteq X \setminus \{v\}} |W_1|!|W_0|!}(Y(W_1 \cup \{v_t\}) - Y(W_1))$$
$$= \sum_{W_1, W_0} \frac{|W_1|!|W_0|!}{\sum_{W_1 \subseteq X \setminus \{v\}} |W_1|!|W_0|!}\left(Y_{W_1=1, W_0=0, v_t} - Y_{W_1=1, W_0=0, v'}\right)$$

The above expression for the Shapley value is equal to the ACS as discussed above.

Since the ACS is equivalent to a Shapley value, the ACS also exhibits properties of the Shapley value. The Shapley value, and by extension the ACS, is the only attribution score that satisfies efficiency (sum of attribution scores equal to the actual difference in Y), null player (attribution of inputs that do not affect output is zero), symmetry (inputs that affect output equally have equal attribution scores) and linearity.

Figure 5:
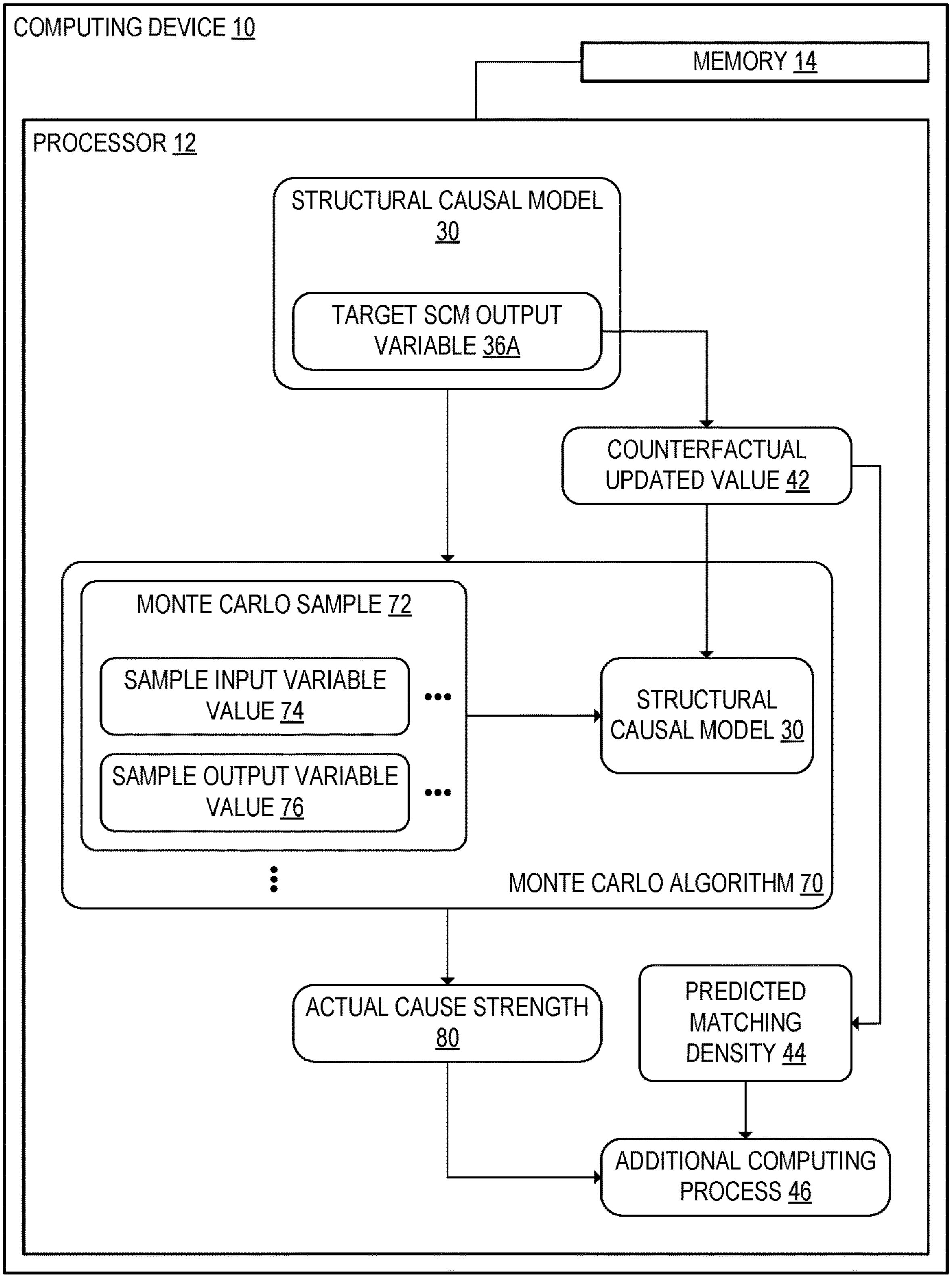
FIG. 5 schematically shows the computing device with the processor configured to compute an actual cause strength, according to the example of FIG. 1.

FIG. 5 shows the computing device 10 when the processor 12 is configured to compute an ACS 80, according to one example. In the example of FIG. 5, the processor 12 is further configured to estimate the ACS 80 of the target SCM output variable 36A on the predicted density value 44. The processor 12 may be configured to compute the ACS 80 at least in part by computing a Shapley value of the target SCM output variable 36A. As discussed above, the Shapley value of the target SCM output variable 36A may be the ACS 80.

When the processor 12 computes the ACS 80, the processor 12 may, for example, be configured to compute an estimate of the Shapley value at a Monte Carlo algorithm 70. The Monte Carlo algorithm 70 may, for example, be a linear approximation algorithm or a multi-linear extension algorithm. When the processor 12 executes the Monte Carlo algorithm 70, the processor 12 may be configured to perform a Monte Carlo approximation over a plurality of sets of values of SCM input variables 34 and SCM output variables 36 other than the target SCM output variable 36A. These sets of values may be included in respective Monte Carlo samples 72 that each include a plurality of sample input variable values 74 and a plurality of sample output variable values 76. The sets of values included in the Monte Carlo samples 72 may be used as values of W in the equation for the ACS 80 discussed above. When the Monte Carlo algorithm 70 is executed, the processor 12 may be configured to input the values of the variables included in the Monte Carlo samples 72, as well as the counterfactual updated value 42 of the target SCM output variable 36A, into the SCM 30. At the SCM 30, the processor 12 may be further configured to compute respective values of the output variable Y for the Monte Carlo samples 72 and compute a weighted sum over the values of Y as discussed above to estimate the ACS 80.

Subsequently to estimating the ACS 80 for the target SCM output variable 36A, the processor 12 may be further configured to output the estimate of the ACS 80 to the additional computing process 46. The processor 12 may, for example, be configured to output both the predicted matching density 44 and the ACS 80 to the GUI 48.

Figure 6:
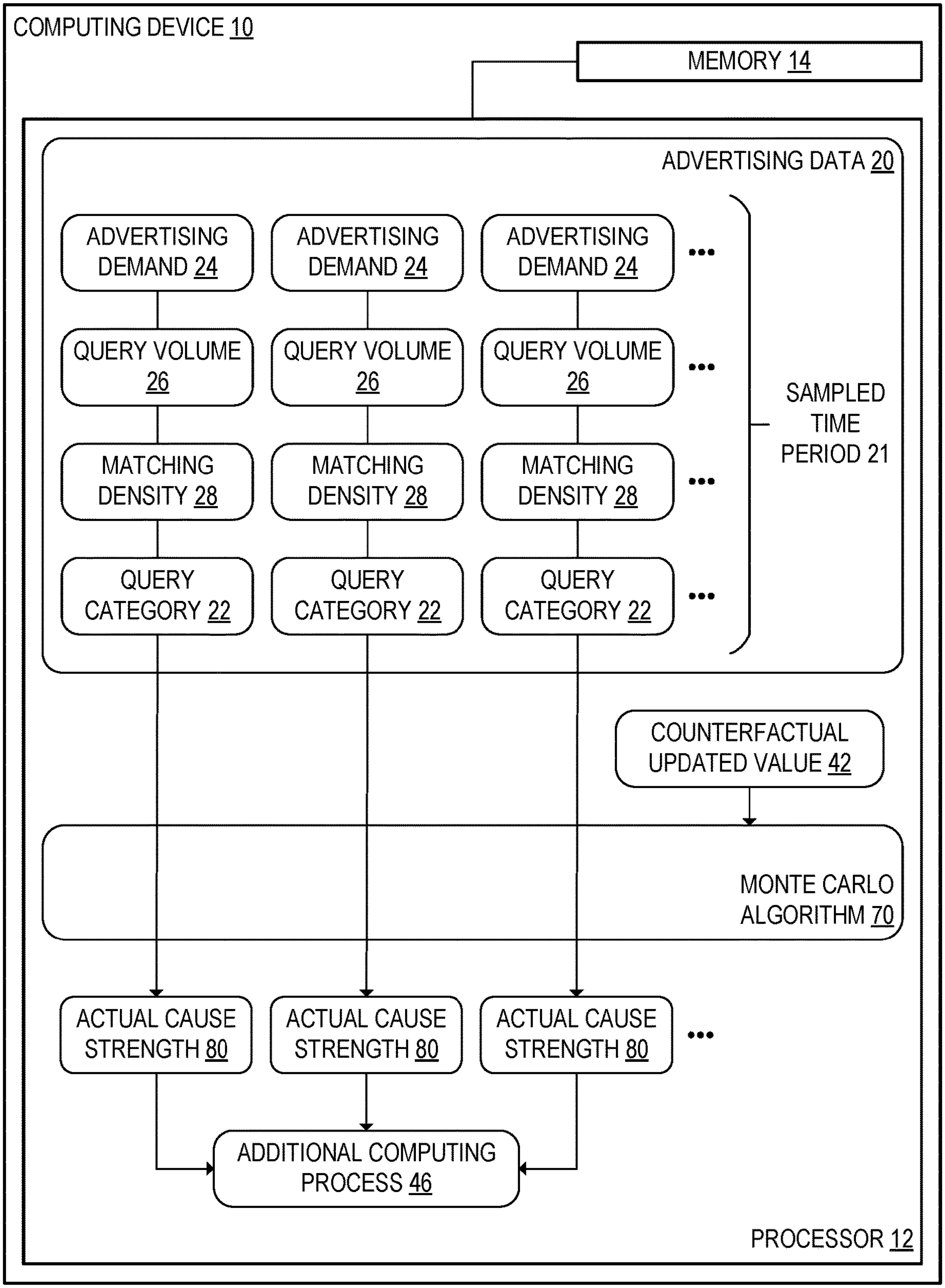
FIG. 6 schematically shows the computing device with the processor configured to compute a plurality of actual cause strengths for a plurality of query categories, according to the example of FIG. 5.

In some examples, as shown in FIG. 6, the processor 12 may be configured to receive the advertising data 20 for a plurality of query categories 22 within the sampled time period 21. The advertising data 20, in such examples, may include corresponding values of the advertising demand 24, query volume 26, and matching density 28 for each of the query categories 22 at a plurality of time intervals 23 within the sampled time period 21. The processor 12 may be further configured to determine respective estimates of a plurality of actual cause strengths 80 for the plurality of query categories 22 when the target SCM output variable 36A has the counterfactual updated value 42. In addition, the processor 12 may be further configured to output the estimates of the plurality of actual cause strengths 80. Thus, an advertising customer may compare the actual cause strengths 80 for different query categories 22 within the sampled time period 21 to determine the extent to which the different query categories 22 contributed to the aggregate density 54 in that sampled time period 21.

Formalism for the estimation of the predicted matching density 44 is further discussed below. Given an actual value $y_t = Y_{v,w}(u)$, the target counterfactual estimand can be written as, $Y_{v',w}(u)$ where V, W refer to observed variables, v' is a hypothetical changed value, and u refers to the unobserved noise variables. The counterfactual value Y may be indirectly caused by the inputs V, W in some examples. Accordingly, the SCM 30 may be used to estimate the counterfactual output Y. In addition, using the structure of the SCM 30 may allow the number of inputs per variable to be reduced, rather than assuming that each of the SCM output variables 36 depends upon each of the SCM input variables 34.

A three-step counterfactual algorithm may be performed to estimate Y. In this three-step counterfactual algorithm, the structural equations may be assumed to have additive error. Error may be added to the values of the variables of the SCM 30 according to the equations $y = g(Pa(Y)) + \varepsilon_y$; $x_i = g_i(Pa(X_i)) + \varepsilon_i \forall x_i \in X$ where Pa(.) refers to parents of the node in the causal graph.

To compute $Y_{v',w}(u)$, the following steps may be performed:

- Abduction: Infer error of structural equations on the observed variables, $\hat{\varepsilon}_y = y_t - g(Pa(Y))$; $\hat{\varepsilon}_i = x_{i,t} - g_i(Pa(X_i))$.
- Action: Set the value of $V \leftarrow v'$, ignoring any causes of V.
- Prediction: Use the inferred error term and new value of v' to estimate the new outcome, by proceeding stepwise for each level of the graph, starting with V's children and proceeding downstream until the Y node's value is changed.

$$x'_j = g(Pa'(X_j)) + \hat{\varepsilon}_j \forall x_j \in \text{Descendants}(V);$$

$y' = g(Pa'(Y)) + \hat{\varepsilon}_y = y_t + g(Pa'(Y)) - g(Pa(Y))$. When structural equations g are not known, they may be learned by a structural equation machine learning model 60 that uses graph parents of a variable as features, as discussed above with reference to FIG. 2.

Using the above steps, the processor 12 may be configured to generate the structural equation error value 40, the counterfactual updated value 42, and the predicted matching density 44. When the processor 12 computes the predicted matching density 44, the processor 12 may be configured to generate one or more intermediate predicted values of one or more respective intermediate SCM output variables of the plurality of SCM output variables 36. The one or more intermediate SCM output variables may be located downstream of the target SCM output variable 36A and upstream of the predicted matching density 44 in the SCM 30. For example, when the predicted matching density 44 is an aggregate density 54, as shown in the example of FIG. 2, the category-wise matching densities 28A and 28B may be intermediate predicted values.

Figure 7:
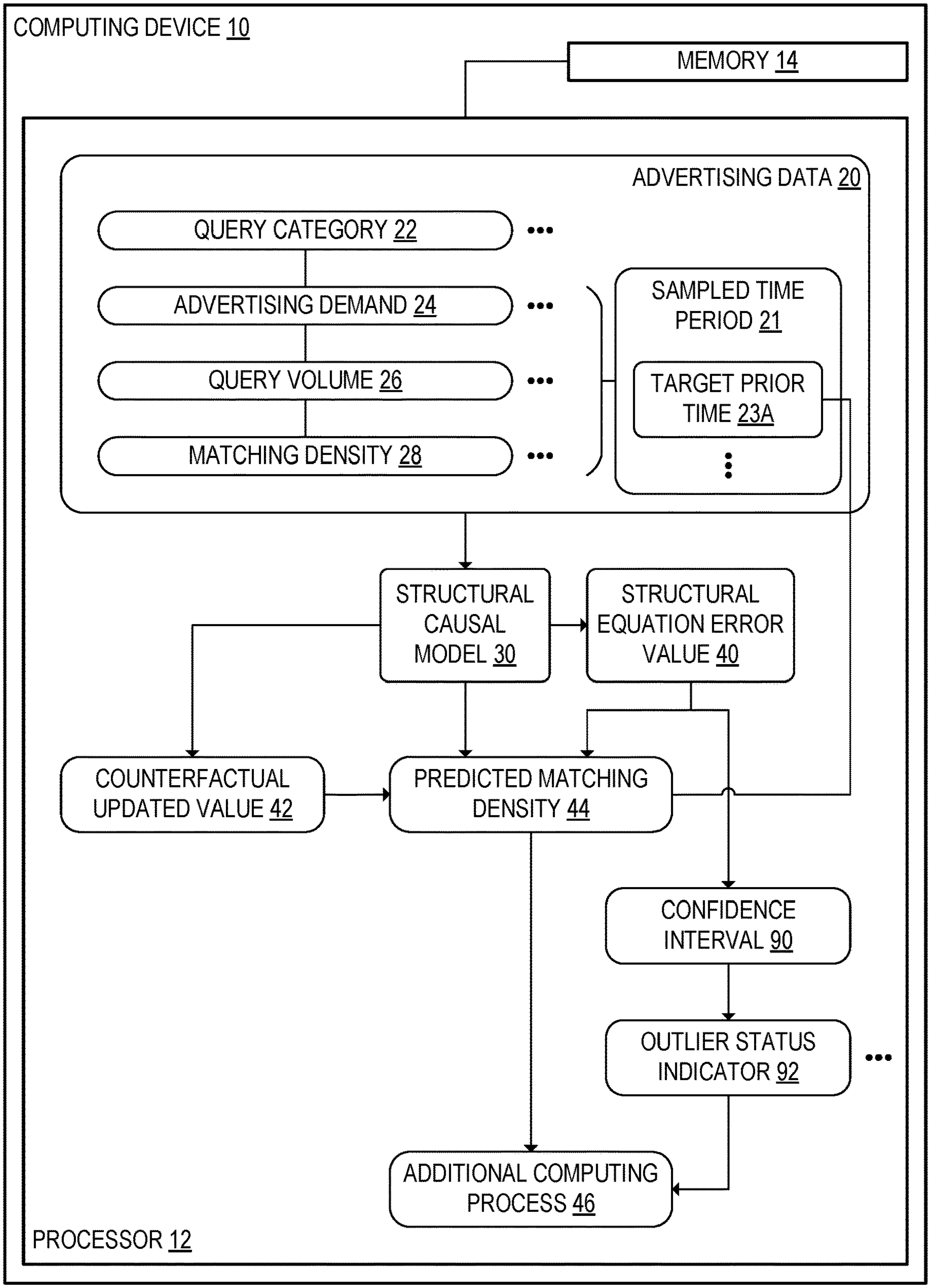
FIG. 7 schematically shows the computing device with the processor configured to compute a predicted matching density for a target prior time, according to the example of FIG. 1.

In some examples, as shown in FIG. 7, the techniques discussed above for computing predicted matching densities 44 and actual cause strengths 80 may be used to perform analytics on logged advertising data 20. In such examples, the predicted matching density 44 is associated with a target prior time 23A, which may be a specific time interval included in the sampled time period 21. For example, the target prior time 23A may be a specific day. The predicted matching density 44 at the target prior time 23A may be compared to the empirical value of the matching density 28 measured for the target prior time 23A in order to determine whether the SCM 30 has accurately predicted the measured matching density 28.

The processor 12 may be further configured to determine that the matching density 28 received for the target prior time 23A is an outlier density value. Determining that the predicted matching density 44 is an outlier density value may include computing a confidence interval 90 of the predicted matching density 44 over the sampled time period 21. The confidence interval 90 may, for example, be a 90%, 95%, or 99% confidence interval, or may alternatively have some other threshold. The processor 12 may, for example, be configured to compute the confidence interval 90 based at least in part on the structural equation error value 40. For example, the processor 12 may be configured to model the structural equation error as a normally distributed random variable.

When the predicted matching density 44 is generated for the target prior time 23A, the prior target time 23A may be the time t for which the corresponding matching density 28 is not used as an input when the SCM 30 is generated. Thus, the training data and test data for the structural equation machine learning model 60 may be kept separate.

Determining that the matching density 28 is an outlier at the target prior time 23A may further include determining that the matching density 28 at the target prior time 23A is outside the confidence interval 90. The processor 12 may, for example, be configured to assign a corresponding outlier status indicator 92 to the respective matching density 28 for each time interval 23 indicating whether that matching density 28 has an outlier value.

In response to determining that the matching density 28 is an outlier, the processor 12 may be further configured to output, to the additional computing process 46, an indication that the predicted matching density 28 is an outlier density value. The processor 12 may, for example, be configured to output the plurality of matching densities 28 along with their respective outlier status indicators 92 for display at the GUI 48. As another example, the processor 12 may be configured to filter the plurality of matching densities 28 such that the one or more outlier density values are specifically output to the additional computing process 46 for further processing.

In some examples, the processor 12 may be configured to perform actual cause attribution as discussed above specifically on values of the matching density 28 that are identified as outlier values. Thus, the processor 12 may be configured to save computing resources by filtering the plurality of matching densities 28 to obtain a subset of values of the matching density 28 that are likely to be of interest to the user, rather than performing actual cause attribution on all the measured values of the matching density 28.

Figure 8:
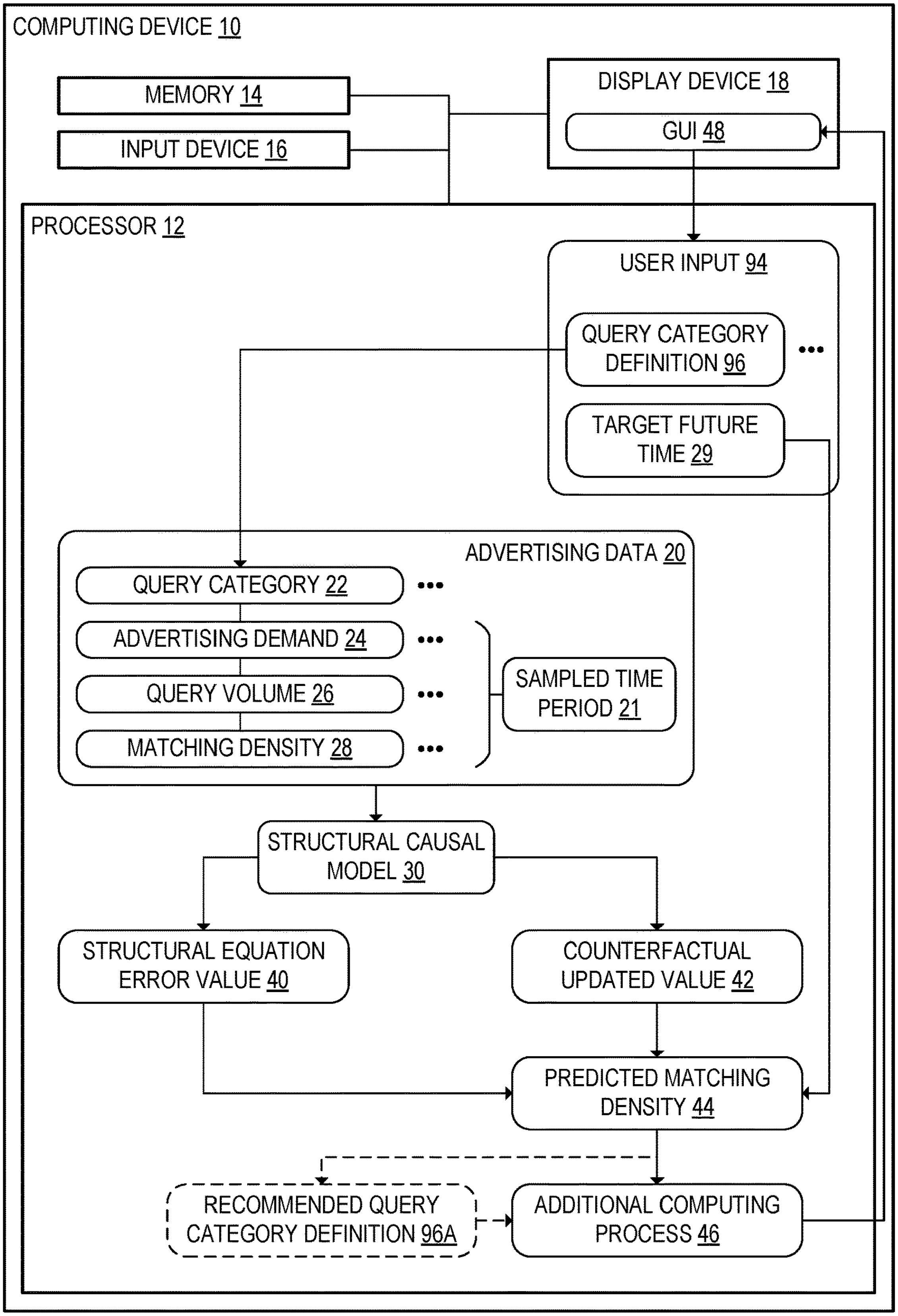
FIG. 8 schematically shows the computing device with the processor configured to compute a predicted matching density for a target future time, according to the example of FIG. 1.

The processor 12 may, in some examples, be configured to utilize the SCM 30 to predict future matching density values additionally or alternatively to analyzing measured values of the matching density 28. FIG. 8 schematically shows the computing device 10 in an example in which the predicted matching density 44 is associated with a target future time 29 outside the sampled time period 21. In the example of FIG. 8, the processor 12 is configured to generate the predicted matching density 44 in response to receiving, at the GUI 48, a user input 94 including an indication of the target future time 29 and one or more query category definitions 96.

The processor 12 may be further configured to generate the predicted matching density 44 at the target future time 29. When the processor 12 computes the predicted matching density 44, the processor 12 may be configured to estimate a structural equation error value 40 for the plurality of structural equations 32 included in the SCM 30. Since the processor 12 does not have access to a measured value of the matching density 28 at the target future time 29, the processor 12 may be configured to use the structural equation error value 40 computed for a prior time as an estimate of the structural equation error value 40 for the target future time 29. For example, the processor 12 may be configured to use a structural equation error value 40 computed for a day seven days, fourteen days, or one year before the target future time 29. At the SCM 30, the processor 12 may be further configured to generate a counterfactual updated value 42 of the advertising demand 24 or query volume 26 at the target future time 29. The processor 12 may be further configured to compute the predicted matching density 44 from the structural equation error value 40 and the counterfactual updated value 42. Subsequently to generating the predicted matching density 44, the processor 12 may be further configured to output the predicted matching density 44 for display at the GUI 48.

In some examples, the user input 94 may include a plurality of query category definitions 96 that are configured to be subject to comparison. In such examples, the processor 12 may be configured to compute respective predicted matching densities 44 for each of the plurality of query category definitions 96. The processor 12 may be further configured to output, for display at the GUI 48, a query category definition 96 that has a highest predicted matching density 44 among the plurality of query category definitions 96. Such a query category definition 96 may be indicated as a recommended query category definition 96A. Thus, the user may enter a plurality of different query category definitions 96 that are under consideration for use in an advertising campaign. The user may receive a recommendation of the query category definition 96 with the highest predicted matching density 44.

In some examples in which the processor 12 generates a predicted matching density 44 for a target future time 29, the processor 12 may be configured to generate respective predicted matching densities 44 for a plurality of target future times 29. The plurality of target future times 29 may be contiguous time intervals that form a target future time period. Alternatively, at least some of the plurality of target future times 29 may be spaced apart from each other. For example, the processor 12 may be configured to generate predicted matching densities 44 for a plurality of future weekdays while excluding weekends.

Figure 9A:
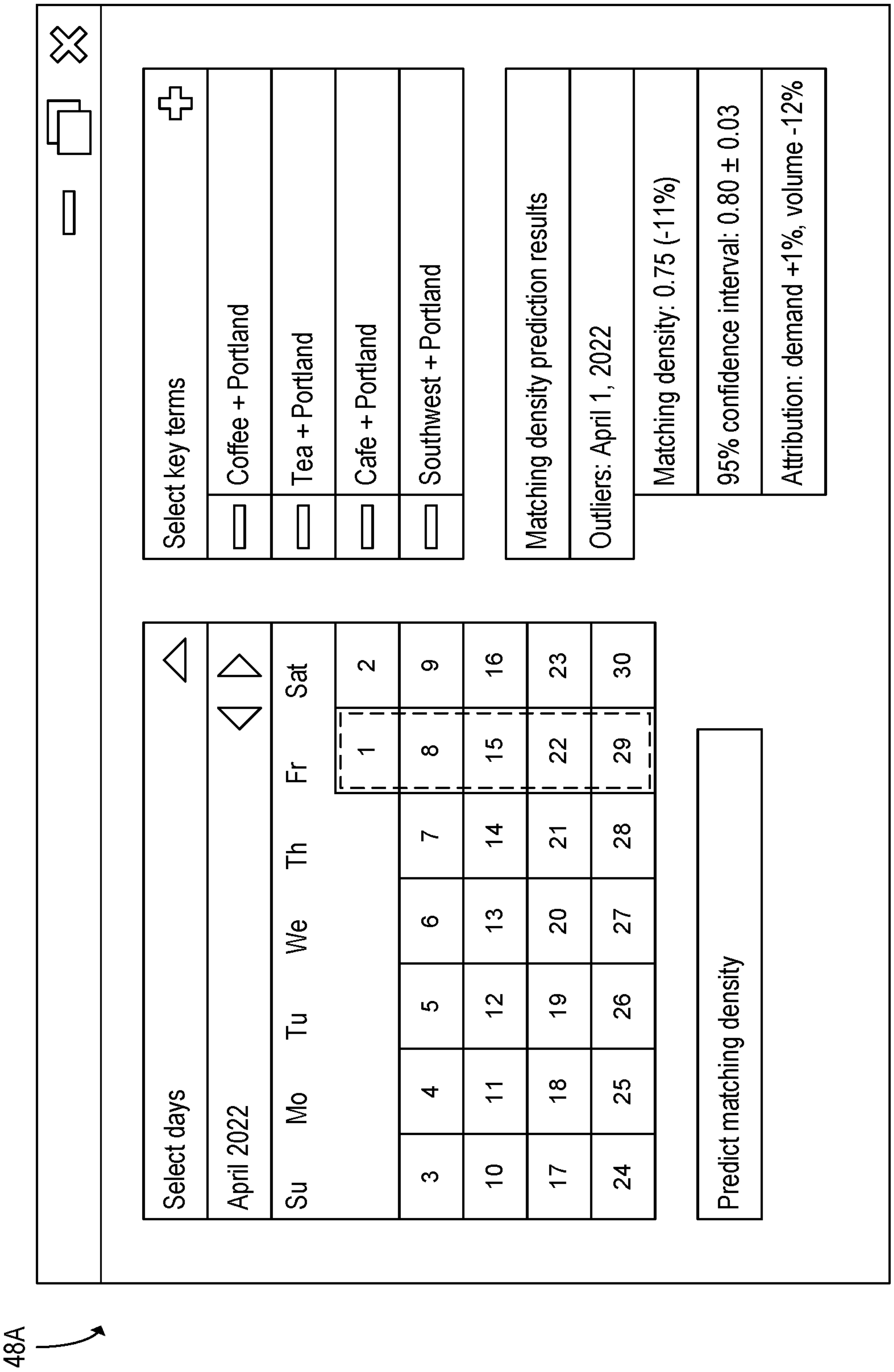
FIG. 9A shows a first graphical user interface (GUI) view of an example GUI at which a predicted matching density is displayed, according to the example of FIG. 1.

FIG. 9A shows a first GUI view 48A of an example GUI 48 that may be displayed at the display device 18. In the example first GUI view 48A, the user has selected a plurality of key terms that are included in the query category definition 96. The user has also selected a plurality of time intervals 23 for which respective predicted matching densities 44 are configured to be estimated. The processor 12, in the example of FIG. 9A, is configured to identify an outlier density value among the respective matching densities 28 measured for a plurality of days. In addition, subsequently to identifying the day for which the matching density 28 is an outlier, the processor 12 is further configured to generate attribution scores for the advertising demand 24 and the query volume 26. In the example of FIG. 9A, the actual cause strengths 80 computed for the advertising demand 24 and the query volume 26 sum to the total difference between the predicted matching density 44 and the measured matching density 28 for the outlier day.

Figure 9B:
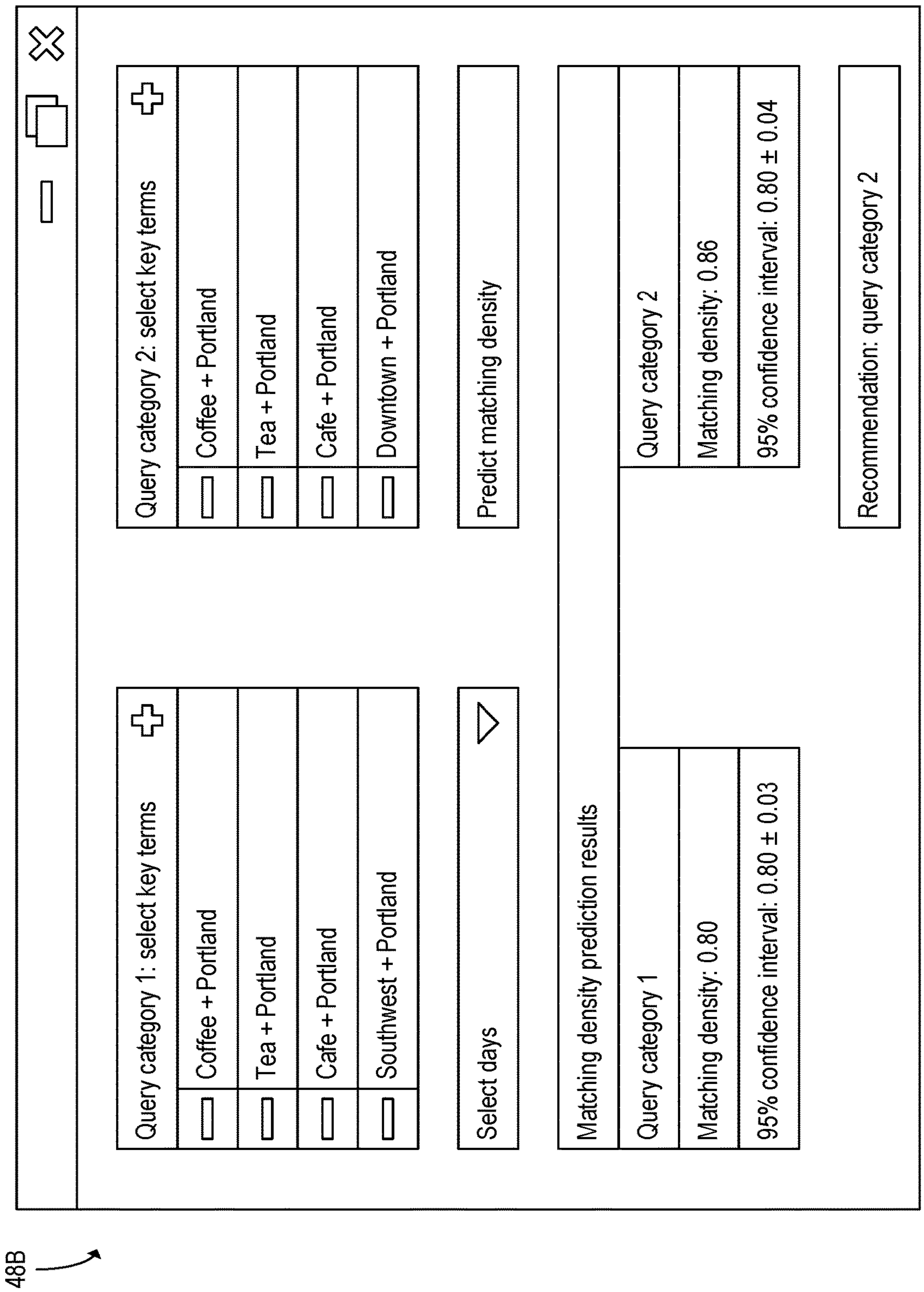
FIG. 9B shows a second GUI view of an example GUI at which predicted matching densities are shown for a plurality of query category definitions, according to the example of FIG. 1.

FIG. 9B shows a second GUI view 48B of the example GUI 48 when the processor 12 is configured to generate predicted matching densities 44 for a plurality of query category definitions 96 at one or more target future times 29. In the example of FIG. 9B, the processor 12 is configured to generate respective matching density prediction results for two query category definitions 96. The processor 12 is further configured to indicate the second query category definition as the recommended query category definition due to the second query category definition having a higher predicted matching density 44.

Figure 10A:
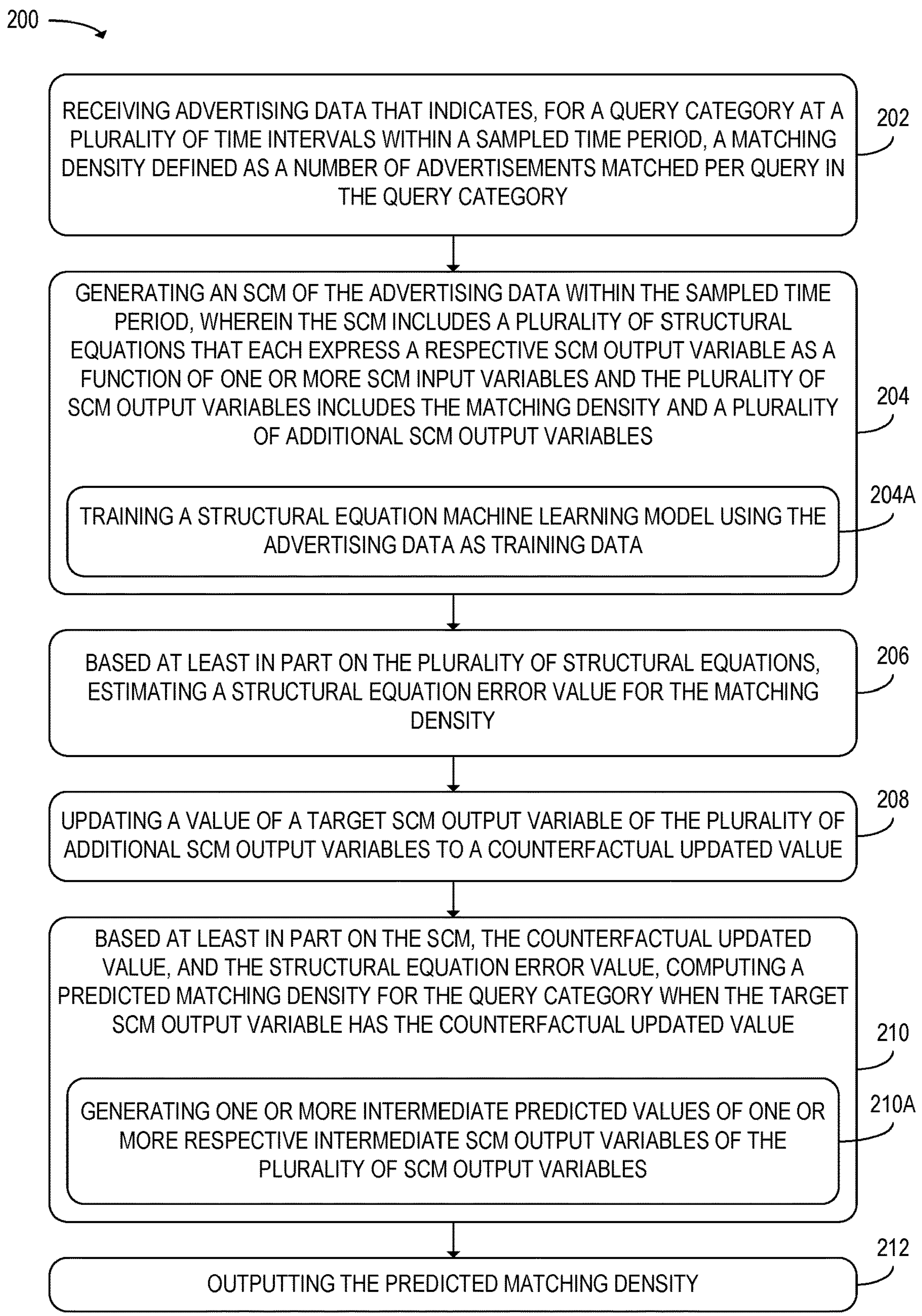
FIG. 10A shows a flowchart of an example method for use with a computing device to generate a predicted matching density, according to the example of FIG. 1.

FIG. 10A shows a flowchart of an example method 200 for use with a computing device. For example, the method 200 may be performed at the computing device 10 of FIG. 1. At step 202, the method 200 may include receiving advertising data. The advertising data may indicate, for a query category within a sampled time period, a matching density defined as a number of advertisements matched per query in the query category. The query category may, for example, include one or more keywords, key phrases, and/or keyword categories. The query category may be specified by a query category definition received via user input. In addition to the matching density, the advertising data may further include respective values of an advertising demand and a query volume of the query category for the sampled time period.

At step 204, the method 200 may further include generating a structural causal model (SCM) of the advertising data within the sampled time period. The SCM may include a plurality of structural equations that each express a respective SCM output variable as a function of one or more SCM input variables. The plurality of SCM output variables may include the matching density and a plurality of additional SCM output variables. The SCM may have one or more variables that are used as both an SCM input variable and an SCM output variable, thereby functioning as one or more intermediate SCM output variables. The SCM may be structured as a DAG.

In some examples, step 204 may include, at step 204A, training a structural equation machine learning model using the advertising data as training data. The structural equation machine learning model may be a deep neural network, and may, for example, be trained via supervised learning. During training of the structural equation machine learning model, the advertising demand and the query volume included in the advertising data may be used as training inputs and the matching density included in the advertising data may be used as a ground-truth output.

At step 206, the method 200 may further include estimating a structural equation error value for the matching density based at least in part on the plurality of structural equations. The structural equation error value may, for example, be computed as a difference between an observed category-wise matching density for the query category and a matching density estimated for that query category at the SCM.

At step 208, the method 200 may further include updating a value of a target SCM output variable of the plurality of additional SCM output variables to a counterfactual updated value. For example, the target SCM output variable may be the advertising demand or the query volume of the query category.

At step 210, the method 200 may further include computing a predicted matching density for the query category when the target SCM output variable has the counterfactual updated value. The predicted matching density may be computed based at least in part on the SCM, the counterfactual updated value, and the structural equation error value. At step 210A, computing the predicted matching density may include, in some examples, generating one or more intermediate predicted values of the one or more respective intermediate SCM output variables of the plurality of SCM output variables. The one or more intermediate SCM output variables for which the one or more respective intermediate values are generated, in such examples, may be located downstream of the target SCM output variable and upstream of the predicted matching density in the SCM. Thus, the values of the one or more intermediate SCM output variables may be iteratively generated, moving downstream in the DAG structure of the SCM.

At step 212, the method 200 may further include outputting the predicted matching density. For example, the predicted matching density may be output to a GUI generating program for display at a GUI. As another example, the predicted matching density may be output to an advertising campaign scheduling program at which an advertising campaign schedule may be programmatically generated.

Figure 10B:
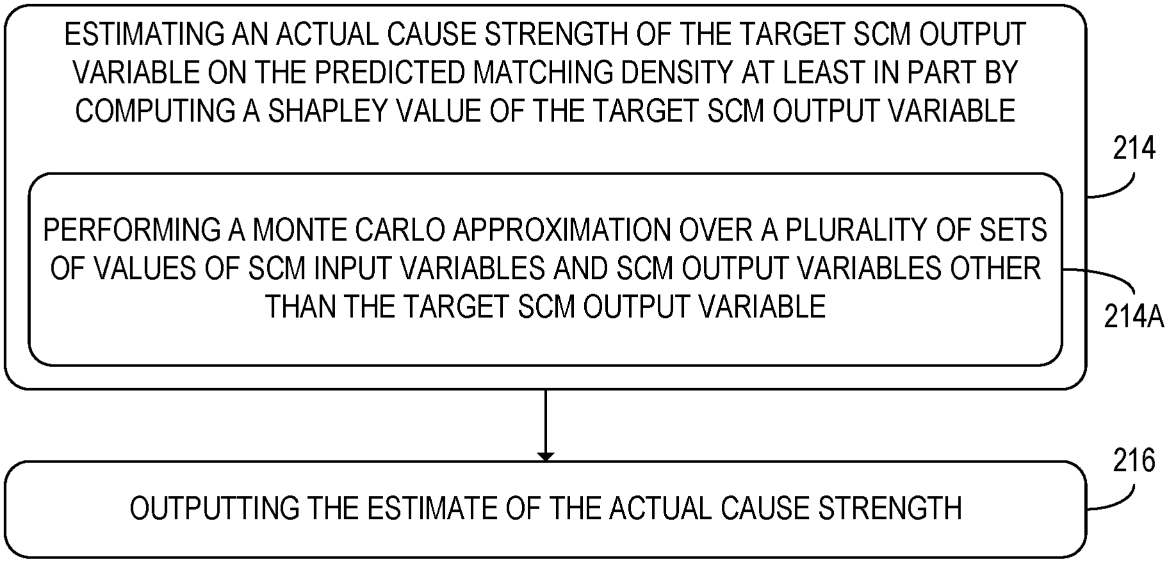
FIG. 10B shows additional steps of the method of FIG. 10A that may be performed in some examples.

FIG. 10B shows additional steps of the method 200 that may be performed in some examples. At step 214, the method 200 may further include estimating an ACS of the target SCM output variable on the predicted matching density. For example, strengths of the respective causal contributions of the advertising demand and/or the query volume on the matching density may be estimated at step 214. The ACS may be estimated at least in part by computing a Shapley value of the target SCM output variable. In some examples, at step 214A, step 214 may include performing a Monte Carlo approximation over a plurality of sets of values of SCM input variables and SCM output variables other than the target SCM output variable. The Monte Carlo approximation may allow the Shapley value to be estimated when computing the exact Shapley value would be too computationally intensive. At step 216, the method 200 may further include outputting the estimate of the actual cause strength. For example, the estimate of the ACS may be output for display at the GUI along with the predicted matching density.

Figure 10C:
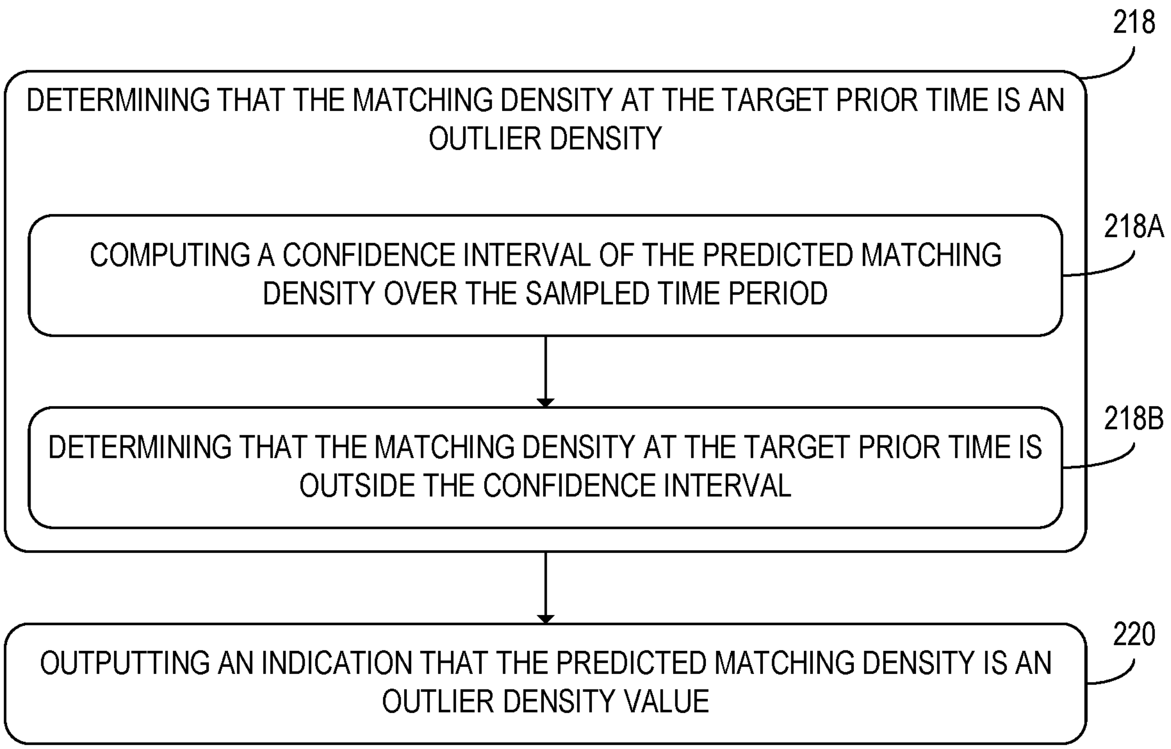
FIG. 10C shows additional steps of the method of FIG. 10A that may be performed in some examples in which the predicted matching density is associated with a target prior time.

FIG. 10C shows additional steps of the method 200 that may be performed in some examples when the predicted matching density is associated with a target prior time for which matching density data has been collected. At step 218, the method 200 may further include determining that the matching density at the target prior time is an outlier density value. Determining that the matching density is an outlier density value may include, at step 218A, computing a confidence interval of the predicted matching density over the sampled time period. For example, the confidence interval may be a 90%, 95%, or 99% confidence interval. Determining that the matching density is an outlier density value may further include, at step 218B, determining that the matching density at the target prior time is outside the confidence interval. At step 220, the method 200 may further include outputting an indication that the predicted matching density is an outlier density value.

Figure 10D:
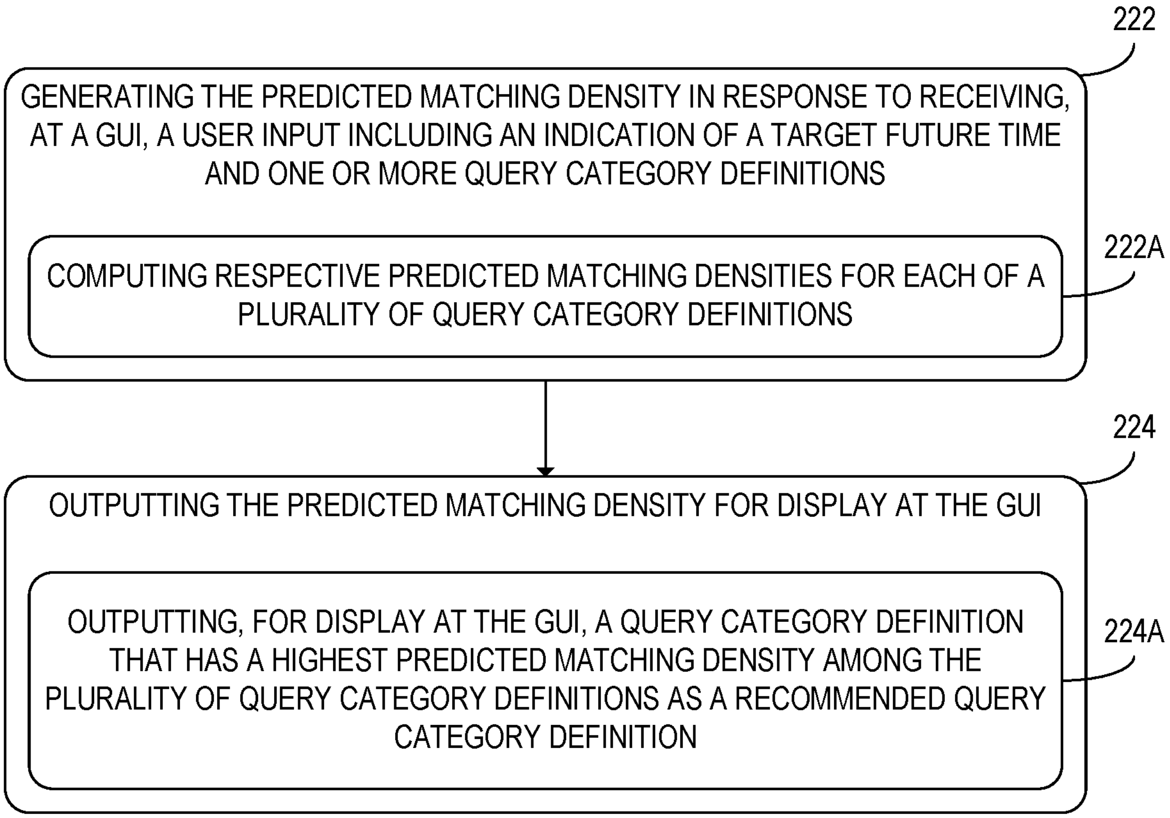
FIG. 10D shows additional steps of the method of FIG. 10A that may be performed in some examples in which the predicted matching density is associated with a target future time.

FIG. 10D shows additional steps of the method 200 that may be performed in some examples when the predicted matching density is associated with a target future time outside the sampled time period. At step 222, the method 200 may further include generating the predicted matching density in response to receiving, at the GUI, a user input including an indication of the target future time and one or more query category definitions. In examples in which step 222 is performed, the method 200 may further include, at step 222A, computing respective predicted matching densities for each of a plurality of query category definitions.

At step 224, the method 200 may further include outputting the predicted matching density for display at the GUI. In examples in which a plurality of predicted matching densities are computed at step 222A, the method 200 may further include, at step 224A, outputting a recommended query category definition for display at the GUI. The recommended query category definition may be a query category definition that has a highest predicted matching density among the plurality of query category definitions. Thus, the query category definition that has the highest predicted matching density may be recommended to a user who is designing an advertising campaign.

Using the devices and methods discussed above, the effects of different variables on the matching densities of query categories may be causally modeled. This causal modeling may allow a search engine provider and/or customers of the search engine provider to measure the effectiveness with which advertisements are matched to search queries, which may strongly affect both the revenue collected by the search engine and the performance of the customer's advertising campaign. Matching densities may be estimated for prior times in order to determine whether the observed matching densities at those prior times are outlier values. Additionally or alternatively, matching densities at future times may be predicted. Accordingly, the devices and methods discussed above may allow the customers of the search engine to design advertising campaigns more effectively and more accurately evaluate their performance. The devices and methods discussed above may also allow the search engine provider to more accurately measure the effects that changes to features of the search engine have on the matching density and to distinguish the effects of such changes to the search engine from other factors that produce changes in the matching density.

In some embodiments, the methods and processes described herein may be tied to a computing system of one or more computing devices. In particular, such methods and processes may be implemented as a computer-application program or service, an application-programming interface (API), a library, and/or other computer-program product.

Figure 11:
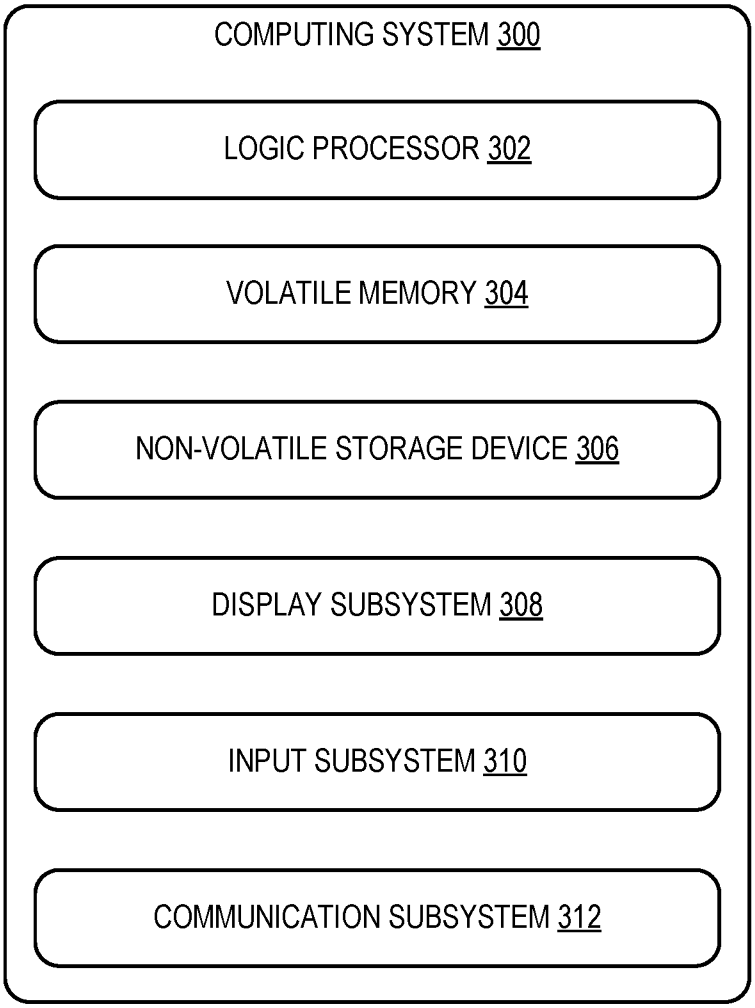
FIG. 11 shows a schematic view of an example computing environment in which the computing device of FIG. 1 may be instantiated.

FIG. 11 schematically shows a non-limiting embodiment of a computing system 300 that can enact one or more of the methods and processes described above. Computing system 300 is shown in simplified form. Computing system 300 may embody the computing device 10 described above and illustrated in FIG. 1. Components of the computing system 300 may be included in one or more personal computers, server computers, tablet computers, home-entertainment computers, network computing devices, gaming devices, mobile computing devices, mobile communication devices (e.g., smart phone), and/or other computing devices, and wearable computing devices such as smart wristwatches and head mounted augmented reality devices.

Computing system 300 includes a logic processor 302 volatile memory 304, and a non-volatile storage device 306. Computing system 300 may optionally include a display subsystem 308, input subsystem 310, communication subsystem 312, and/or other components not shown in FIG. 11.

Logic processor 302 includes one or more physical devices configured to execute instructions. For example, the logic processor may be configured to execute instructions that are part of one or more applications, programs, routines, libraries, objects, components, data structures, or other logical constructs. Such instructions may be implemented to perform a task, implement a data type, transform the state of one or more components, achieve a technical effect, or otherwise arrive at a desired result.

The logic processor may include one or more physical processors (hardware) configured to execute software instructions. Additionally or alternatively, the logic processor may include one or more hardware logic circuits or firmware devices configured to execute hardware-implemented logic or firmware instructions. Processors of the logic processor 302 may be single-core or multi-core, and the instructions executed thereon may be configured for sequential, parallel, and/or distributed processing. Individual components of the logic processor optionally may be distributed among two or more separate devices, which may be remotely located and/or configured for coordinated processing. Aspects of the logic processor may be virtualized and executed by remotely accessible, networked computing devices configured in a cloud-computing configuration. In such a case, these virtualized aspects are run on different physical logic processors of various different machines, it will be understood.

Volatile memory 304 may include physical devices that include random access memory. Volatile memory 304 is typically utilized by logic processor 302 to temporarily store information during processing of software instructions. It will be appreciated that volatile memory 304 typically does not continue to store instructions when power is cut to the volatile memory 304.

Non-volatile storage device 306 includes one or more physical devices configured to hold instructions executable by the logic processors to implement the methods and processes described herein. When such methods and processes are implemented, the state of non-volatile storage device 306 may be transformed—e.g., to hold different data.

Non-volatile storage device 306 may include physical devices that are removable and/or built-in. Non-volatile storage device 306 may include optical memory (e.g., CD, DVD, HD-DVD, BLU-RAY DISC™, etc.), semiconductor memory (e.g., ROM, EPROM, EEPROM, FLASH memory, etc.), and/or magnetic memory (e.g., hard-disk drive, floppy-disk drive, tape drive, MRAM, etc.), or other mass storage device technology. Non-volatile storage device 306 may include nonvolatile, dynamic, static, read/write, read-only, sequential-access, location-addressable, file-addressable, and/or content-addressable devices. It will be appreciated that non-volatile storage device 306 is configured to hold instructions even when power is cut to the non-volatile storage device 306.

Aspects of logic processor 302, volatile memory 304, and non-volatile storage device 306 may be integrated together into one or more hardware-logic components. Such hardware-logic components may include field-programmable gate arrays (FPGAs), program- and application-specific integrated circuits (PASIC/ASICs), program- and application-specific standard products (PSSP/ASSPs), system-on-a-chip (SOC), and complex programmable logic devices (CPLDs), for example.

The terms “module,” “program,” and “engine” may be used to describe an aspect of computing system 300 typically implemented in software by a processor to perform a particular function using portions of volatile memory, which function involves transformative processing that specially configures the processor to perform the function. Thus, a module, program, or engine may be instantiated via logic processor 302 executing instructions held by non-volatile storage device 306, using portions of volatile memory 304. It will be understood that different modules, programs, and/or engines may be instantiated from the same application, service, code block, object, library, routine, API, function, etc. Likewise, the same module, program, and/or engine may be instantiated by different applications, services, code blocks, objects, routines, APIs, functions, etc. The terms “module,” “program,” and “engine” may encompass individual or groups of executable files, data files, libraries, drivers, scripts, database records, etc.

When included, display subsystem 308 may be used to present a visual representation of data held by non-volatile storage device 306. The visual representation may take the form of a graphical user interface (GUI). As the herein described methods and processes change the data held by the non-volatile storage device, and thus transform the state of the non-volatile storage device, the state of display subsystem 308 may likewise be transformed to visually represent changes in the underlying data. Display subsystem 308 may include one or more display devices utilizing virtually any type of technology. Such display devices may be combined with logic processor 302, volatile memory 304, and/or non-volatile storage device 306 in a shared enclosure, or such display devices may be peripheral display devices.

When included, input subsystem 310 may comprise or interface with one or more user-input devices such as a keyboard, mouse, touch screen, or game controller. In some embodiments, the input subsystem may comprise or interface with selected natural user input (NUI) componentry. Such componentry may be integrated or peripheral, and the transduction and/or processing of input actions may be handled on- or off-board. Example NUI componentry may include a microphone for speech and/or voice recognition; an infrared, color, stereoscopic, and/or depth camera for machine vision and/or gesture recognition; a head tracker, eye tracker, accelerometer, and/or gyroscope for motion detection and/or intent recognition; as well as electric-field sensing componentry for assessing brain activity; and/or any other suitable sensor.

When included, communication subsystem 312 may be configured to communicatively couple various computing devices described herein with each other, and with other devices. Communication subsystem 312 may include wired and/or wireless communication devices compatible with one or more different communication protocols. As non-limiting examples, the communication subsystem may be configured for communication via a wireless telephone network, or a wired or wireless local- or wide-area network, such as a HDMI over WI-FI™ connection. In some embodiments, the communication subsystem may allow computing system 300 to send and/or receive messages to and/or from other devices via a network such as the Internet.

The following paragraphs discuss several aspects of the present disclosure. According to one aspect of the present disclosure, a computing device is provided, including a processor configured to receive advertising data. The advertising data may indicate, for a query category at a plurality of time intervals within a sampled time period, a matching density defined as a number of advertisements matched per query in the query category. The processor may be further configured to generate a structural causal model (SCM) of the advertising data within the sampled time period. The SCM may include a plurality of structural equations that each express a respective SCM output variable as a function of one or more SCM input variables. The plurality of SCM output variables may include the matching density and a plurality of additional SCM output variables. Based at least in part on the plurality of structural equations, the processor may be further configured to estimate a structural equation error value for the matching density. The processor may be further configured to update a value of a target SCM output variable of the plurality of additional SCM output variables to a counterfactual updated value. Based at least in part on the SCM, the counterfactual updated value, and the structural equation error value, the processor may be further configured to compute a predicted matching density for the query category when the target SCM output variable has the counterfactual updated value. The processor may be further configured to output the predicted matching density.

According to this aspect, the target SCM output variable may be an advertising demand or a query volume of the query category.

According to this aspect, the advertising data may further include respective values of the advertising demand and the query volume for the sampled time period.

According to this aspect, the processor may be configured to generate the SCM at least in part by training a structural equation machine learning model using the advertising data as training data.

According to this aspect, the processor may be further configured to estimate an actual cause strength of the target SCM output variable on the predicted matching density at least in part by computing a Shapley value of the target SCM output variable. The processor may be further configured to output the estimate of the actual cause strength.

According to this aspect, the processor may be configured to compute the Shapley value of the target SCM output variable at least in part by performing a Monte Carlo approximation over a plurality of sets of values of SCM input variables and SCM output variables other than the target SCM output variable.

According to this aspect, the processor may be further configured to receive the advertising data for a plurality of query categories within the sampled time period. The processor may be further configured to determine respective estimates of a plurality of actual cause strengths for the plurality of query categories when the target SCM output variable has the counterfactual updated value. The processor may be further configured to output the estimates of the plurality of actual cause strengths.

According to this aspect, the processor may be configured to compute the predicted matching density at least in part by generating one or more intermediate predicted values of one or more respective intermediate SCM output variables of the plurality of SCM output variables. The one or more intermediate SCM output variables may be located downstream of the target SCM output variable and upstream of the predicted matching density in the SCM.

According to this aspect, the predicted matching density at a time interval of the plurality of time intervals may be associated with a target prior time. The processor may be further configured to determine that the matching density at the target prior time is an outlier density value at least in part by computing a confidence interval of the predicted matching density over the sampled time period and determining that the matching density at the target prior time is outside the confidence interval. The processor may be further configured to output an indication that the predicted matching density is an outlier density value.

According to this aspect, the predicted matching density may be associated with a target future time outside the sampled time period. The processor may be configured to generate the predicted matching density in response to receiving, at a graphical user interface (GUI), a user input including an indication of the target future time and one or more query category definitions. The processor may be further configured to output the predicted matching density for display at the GUI.

According to this aspect, the user input may include a plurality of query category definitions. The processor may be further configured to compute respective predicted matching densities for each of the plurality of query category definitions. The processor may be further configured to output, for display at the GUI, a query category definition that has a highest predicted matching density among the plurality of query category definitions as a recommended query category definition.

According to another aspect of the present disclosure, a method for use with a computing device is provided. The method may include receiving advertising data that indicates, for a query category at a plurality of time intervals within a sampled time period, a matching density defined as a number of advertisements matched per query in the query category. The method may further include generating a structural causal model (SCM) of the advertising data within the sampled time period. The SCM may include a plurality of structural equations that each express a respective SCM output variable as a function of one or more SCM input variables. The plurality of SCM output variables may include the matching density and a plurality of additional SCM output variables. The method may further include, based at least in part on the plurality of structural equations, estimating a structural equation error value for the matching density. The method may further include updating a value of a target SCM output variable of the plurality of additional SCM output variables to a counterfactual updated value. The method may further include, based at least in part on the SCM, the counterfactual updated value, and the structural equation error value, computing a predicted matching density for the query category when the target SCM output variable has the counterfactual updated value. The method may further include outputting the predicted matching density.

According to this aspect, the target SCM output variable may be an advertising demand or a query volume of the query category.

According to this aspect, the advertising data may further include respective values of the advertising demand and the query volume for the sampled time period.

According to this aspect, generating the SCM may include training a structural equation machine learning model using the advertising data as training data.

According to this aspect, the method may further include estimating an actual cause strength of the target SCM output variable on the predicted matching density at least in part by computing a Shapley value of the target SCM output variable. The method may further include outputting the estimate of the actual cause strength.

According to this aspect, the method may further include computing the predicted matching density at least in part by generating one or more intermediate predicted values of one or more respective intermediate SCM output variables of the plurality of SCM output variables. The one or more intermediate SCM output variables may be located downstream of the target SCM output variable and upstream of the predicted matching density in the SCM.

According to this aspect, the predicted matching density may be associated with a target prior time. The method may further include determining that the matching density at the target prior time is an outlier density value at least in part by computing a confidence interval of the predicted matching density over the sampled time period and determining that the matching density at the target prior time is outside the confidence interval. The method may further include outputting an indication that the predicted matching density is an outlier density value.

According to this aspect, the predicted matching density may be associated with a target future time outside the sampled time period. The method may further include generating the predicted matching density in response to receiving, at a graphical user interface (GUI), a user input including an indication of the target future time and one or more query category definitions. The method may further include outputting the predicted matching density for display at the GUI.

According to another aspect of the present disclosure, a computing device is provided, including a processor configured to receive advertising data associated with a query category and a plurality of time intervals within a sampled time period. The advertising data may include a plurality of respective values of an advertising demand, a query volume, and a matching density for the sampled time period. The matching density may be a number of advertisements matched per query in the query category. The processor may be further configured to generate a structural causal model (SCM) of the advertising data within the sampled time period. The SCM may include a plurality of structural equations. Based at least in part on the SCM, the processor may be further configured to estimate a structural equation error value for the matching density. The processor may be further configured to update a value of a target SCM output variable included in a structural equation of the plurality of structural equations to a counterfactual updated value. Based at least in part on the SCM, the counterfactual updated value, and the structural equation error value, the processor may be further configured to compute a predicted matching density for the query category when the target SCM output variable has the counterfactual updated value. The processor may be further configured to compute a confidence interval of the predicted matching density over the sampled time period. The processor may be further configured to determine that the matching density at the target prior time is outside the confidence interval. The processor may be further configured to output the predicted matching density and an indication that the predicted matching density is an outlier density value.

“And/or” as used herein is defined as the inclusive or v, as specified by the following truth table:

| A | B | A ∨ B |
|---|---|---|
| True | True | True |
| True | False | True |
| False | True | True |
| False | False | False |

It will be understood that the configurations and/or approaches described herein are exemplary in nature, and that these specific embodiments or examples are not to be considered in a limiting sense, because numerous variations are possible. The specific routines or methods described herein may represent one or more of any number of processing strategies. As such, various acts illustrated and/or described may be performed in the sequence illustrated and/or described, in other sequences, in parallel, or omitted. Likewise, the order of the above-described processes may be changed.

The subject matter of the present disclosure includes all novel and non-obvious combinations and sub-combinations of the various processes, systems and configurations, and other features, functions, acts, and/or properties disclosed herein, as well as any and all equivalents thereof.

The invention claimed is:

1. A computing device comprising:
a processor configured to:
receive advertising data that indicates, for a query category at a plurality of time intervals within a sampled time period, a matching density defined as a number of advertisements matched per query in the query category;
generate a structural causal model (SCM) of the advertising data within the sampled time period, wherein:
the SCM includes a plurality of structural equations that each express a respective SCM output variable as a function of one or more SCM input variables; and
the plurality of SCM output variables includes the matching density and a plurality of additional SCM output variables;
based at least in part on the plurality of structural equations, estimate a structural equation error value for the matching density;
update a value of a target SCM output variable of the plurality of additional SCM output variables to a counterfactual updated value;
receive, at a graphical user interface (GUI), a user input including:
an indication of a target future time; and
a query category definition that specifies the query category;
based at least in part on the SCM, the counterfactual updated value, and the structural equation error value, compute a predicted matching density for the target future time and the query category when the target SCM output variable has the counterfactual updated value; and
output the predicted matching density to the GUI.

2. The computing device of claim 1, wherein the target SCM output variable is an advertising demand or a query volume of the query category.

3. The computing device of claim 2, wherein the advertising data further includes respective values of the advertising demand and the query volume for the sampled time period.

4. The computing device of claim 3, wherein the processor is configured to generate the SCM at least in part by training a structural equation machine learning model using the advertising data as training data.

5. The computing device of claim 1, wherein the processor is further configured to:
estimate an actual cause strength of the target SCM output variable on the predicted matching density at least in part by computing a Shapley value of the target SCM output variable; and
output the estimate of the actual cause strength.

6. The computing device of claim 5, wherein the processor is configured to compute the Shapley value of the target SCM output variable at least in part by performing a Monte Carlo approximation over a plurality of sets of values of SCM input variables and SCM output variables other than the target SCM output variable.

7. The computing device of claim 5, wherein the processor is further configured to:
receive the advertising data for a plurality of query categories within the sampled time period;
determine respective estimates of a plurality of actual cause strengths for the plurality of query categories when the target SCM output variable has the counterfactual updated value; and
output the estimates of the plurality of actual cause strengths.

8. The computing device of claim 1, wherein:
the processor is configured to compute the predicted matching density at least in part by generating one or more intermediate predicted values of one or more respective intermediate SCM output variables of the plurality of SCM output variables; and
the one or more intermediate SCM output variables are located downstream of the target SCM output variable and upstream of the predicted matching density in the SCM.

9. The computing device of claim 1, wherein:
the user input includes a plurality of the query category definitions that specify a respective plurality of query categories; and
the processor is further configured to:
compute respective predicted matching densities for each of the plurality of query category definitions; and
output, for display at the GUI, a query category definition that has a highest predicted matching density among the plurality of query category definitions as a recommended query category definition.

10. A method for use with a computing device, the method comprising:
receiving advertising data that indicates, for a query category at a plurality of time intervals within a sampled time period, a matching density defined as a number of advertisements matched per query in the query category;
generating a structural causal model (SCM) of the advertising data within the sampled time period, wherein:
the SCM includes a plurality of structural equations that each express a respective SCM output variable as a function of one or more SCM input variables; and
the plurality of SCM output variables includes the matching density and a plurality of additional SCM output variables;

based at least in part on the plurality of structural equations, estimating a structural equation error value for the matching density;

updating a value of a target SCM output variable of the plurality of additional SCM output variables to a counterfactual updated value;

receiving, at a graphical user interface (GUI), a user input including:

an indication of a target future time; and a query category definition that specifies the query category;

based at least in part on the SCM, the counterfactual updated value, and the structural equation error value, computing a predicted matching density for the target future time and the query category when the target SCM output variable has the counterfactual updated value; and outputting the predicted matching density to the GUI.

11. The method of claim 10, wherein the target SCM output variable is an advertising demand or a query volume of the query category.

12. The method of claim 11, wherein the advertising data further includes respective values of the advertising demand and the query volume for the sampled time period.

13. The method of claim 12, wherein generating the SCM includes training a structural equation machine learning model using the advertising data as training data.

14. The method of claim 10, further comprising:

estimating an actual cause strength of the target SCM output variable on the predicted matching density at least in part by computing a Shapley value of the target SCM output variable; and outputting the estimate of the actual cause strength.

15. The method of claim 10, further comprising computing the predicted matching density at least in part by generating one or more intermediate predicted values of one or more respective intermediate SCM output variables of the plurality of SCM output variables, wherein the one or more intermediate SCM output variables are located downstream of the target SCM output variable and upstream of the predicted matching density in the SCM.

16. A computing device comprising:

a processor configured to:

receive advertising data associated with a query category and a plurality of time intervals within a sampled time period, wherein:

the advertising data includes a plurality of respective values of an advertising demand, a query volume, and a matching density for the sampled time period;

the matching density is a number of advertisements matched per query in the query category;

generate a structural causal model (SCM) of the advertising data within the sampled time period, wherein the SCM includes a plurality of structural equations;

based at least in part on the SCM, estimate a structural equation error value for the matching density;

update a value of a target SCM output variable included in a structural equation of the plurality of structural equations to a counterfactual updated value;

based at least in part on the SCM, the counterfactual updated value, and the structural equation error value, compute a predicted matching density for the query category when the target SCM output variable has the counterfactual updated value, wherein the predicted matching density at a time interval of the plurality of time intervals is associated with a target prior time;

compute a confidence interval of the predicted matching density over the sampled time period; and determine that the matching density at the target prior time is outside the confidence interval; and at a graphical user interface (GUI), output the predicted matching density and an indication that the predicted matching density is an outlier density value.

* * * * *